United States Patent
Yamada

(10) Patent No.: US 8,208,150 B2
(45) Date of Patent: Jun. 26, 2012

(54) PRINTING APPARATUS THAT DETECTS A NON-SUPPORTED FUNCTION

(75) Inventor: Kazuyuki Yamada, Fukushima-ken (JP)

(73) Assignee: Oki Data Corporation, Tokyo (JP)

( * ) Notice: Subject to any disclaimer, the term of this patent is extended or adjusted under 35 U.S.C. 154(b) by 1062 days.

(21) Appl. No.: 12/155,230

(22) Filed: May 30, 2008

(65) Prior Publication Data

US 2008/0297826 A1    Dec. 4, 2008

(30) Foreign Application Priority Data

May 31, 2007 (JP) ................................ 2007-145098

(51) Int. Cl.
G06K 15/00 (2006.01)
(52) U.S. Cl. ................ 358/1.14; 399/85; 710/8; 710/16
(58) Field of Classification Search .................. 358/1.14; 710/8, 16; 399/85
See application file for complete search history.

(56) References Cited

U.S. PATENT DOCUMENTS 6,636,903 B2 * 10/2003 Endoh et al. ..................... 710/8

FOREIGN PATENT DOCUMENTS

| JP | 07-084738 A | 3/1995 |
| JP | 08-147122 | 6/1996 |
| JP | 08-202509 A | 8/1996 |
| JP | 2005-096282 A | 4/2005 |
| JP | 2005-111891 A | 4/2005 |

* cited by examiner

Primary Examiner — King Poon
Assistant Examiner — Peter K Huntsinger
(74) Attorney, Agent, or Firm — Rabin & Berdo, P.C.

(57) ABSTRACT

A printing apparatus is supplied, which receives print job; generates print data from the print job; prints the print data; and has an error eliminating method for easily eliminating error when error occurred.

In the printing apparatus, a non-support function detecting section detects instruction for requesting to use non-support function which does not exist in the printing apparatus; a calculating section calculates a time number of detection regarding the instruction detected by the non-support function detecting section; and a print allowance/disallowance judging section judges whether a print of the print data is allowance or is disallowance on the basis of a calculation result of the time number calculated by the calculating section.

13 Claims, 22 Drawing Sheets

FIG.2A

| NOTIFICATION | NON-SUPPORT FUNCTION | COMMAND | THRESHOLD VALUE | TIME NUMBER |
|---|---|---|---|---|
| ON | FONT (e.g.Gothic) | SETFONT (Gothic SETFONT) | 2 | 0 |
| ON | DUPLEX PRINT | SETDUPLEX (TRUE SETDUPLEX) | 0 | 0 |
| ON | STAPLE | SETSTAPLE (TRUE SETSTAPLE) | 0 | 0 |
| OFF | PAPER SIZE (e.g.A3) | SETPAPERSIZE (A3 SETPAPERSIZE) | 1 | 0 |

FIG.2B

| NOTIFICATION | NON-SUPPORT FUNCTION | COMMAND | THRESHOLD VALUE | TIME NUMBER |
|---|---|---|---|---|
| ON | FONT | SETFONT | 2 | 3 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG.3A

```
...
L1001 — A4 SETPAPERSIZE
L1002 — TRUE SETDUPLEX
L1003 — Mincho SETFONT
L1004 — 50 800 MOVE (ABC) SHOW
L1005 — Gothic SETFONT
L1006 — 50 700 MOVE (DEF) SHOW
L1007 — Gothic-P SETFONT
L1008 — 50 600 MOVE (GHI) SHOW
L1009 — Gothic-I SETFONT
L1010 — 50 500 MOVE (JKL) SHOW
        ...
L1100 — EOF
```

FIG.3B

```
...
A4 SETPAPERSIZE
TRUE SETDUPLEX
Mincho SETFONT
50 800 MOVE (ABC) SHOW
Mincho SETFONT
50 700 MOVE (DEF) SHOW
Mincho SETFONT
50 600 MOVE (GHI) SHOW
Mincho SETFONT
50 500 MOVE (JKL) SHOW

...
EOF
```

FIG.8A

THE FOLLOWING NON-SUPPORT FUNCTION IS DETECTED. ↵

↵

1.FONT ↵

↵

PLEASE CONFIRM THE PRINT JOB.

FIG.8B

"CONSTRUCTION ERROR" IS DETECTED. ↵

↵

PLEASE CONFIRM THE PRINT JOB.

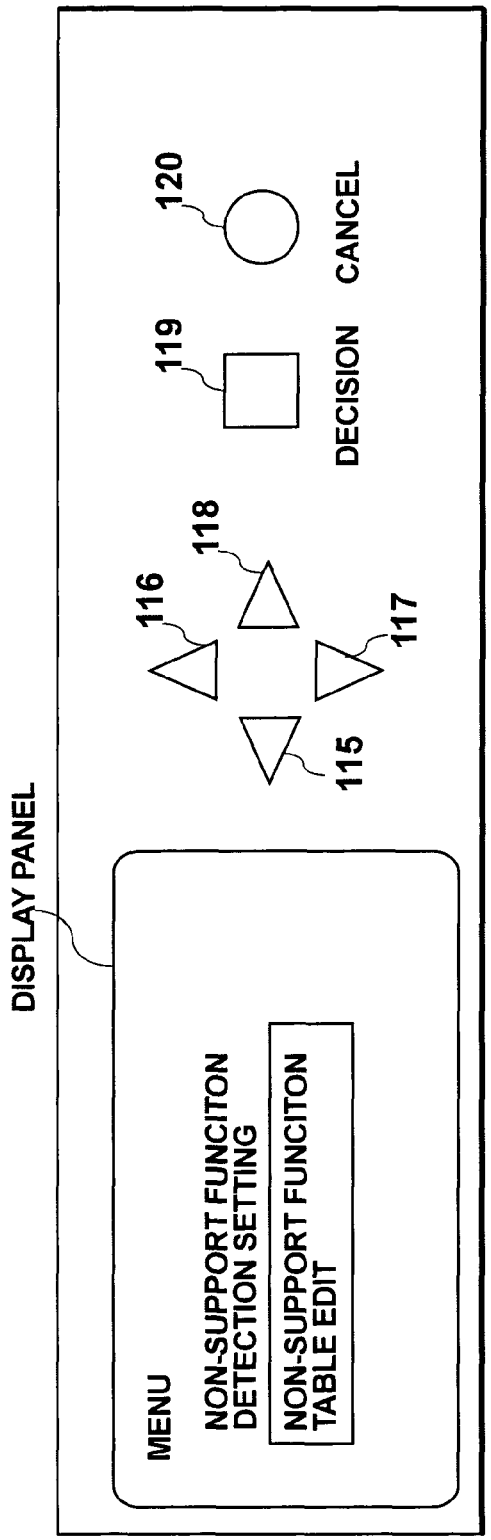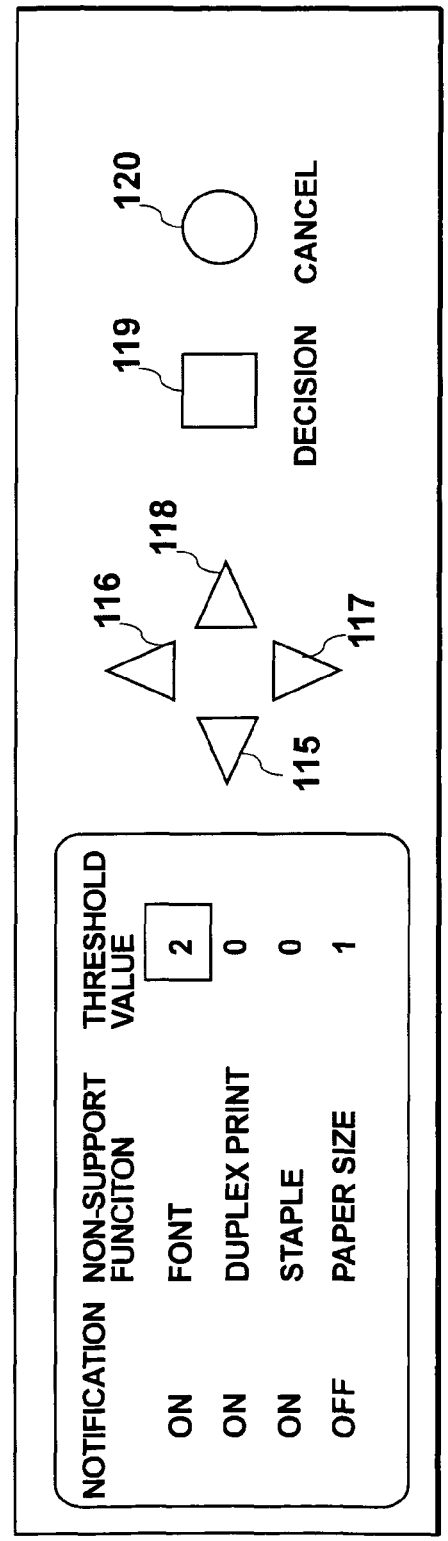

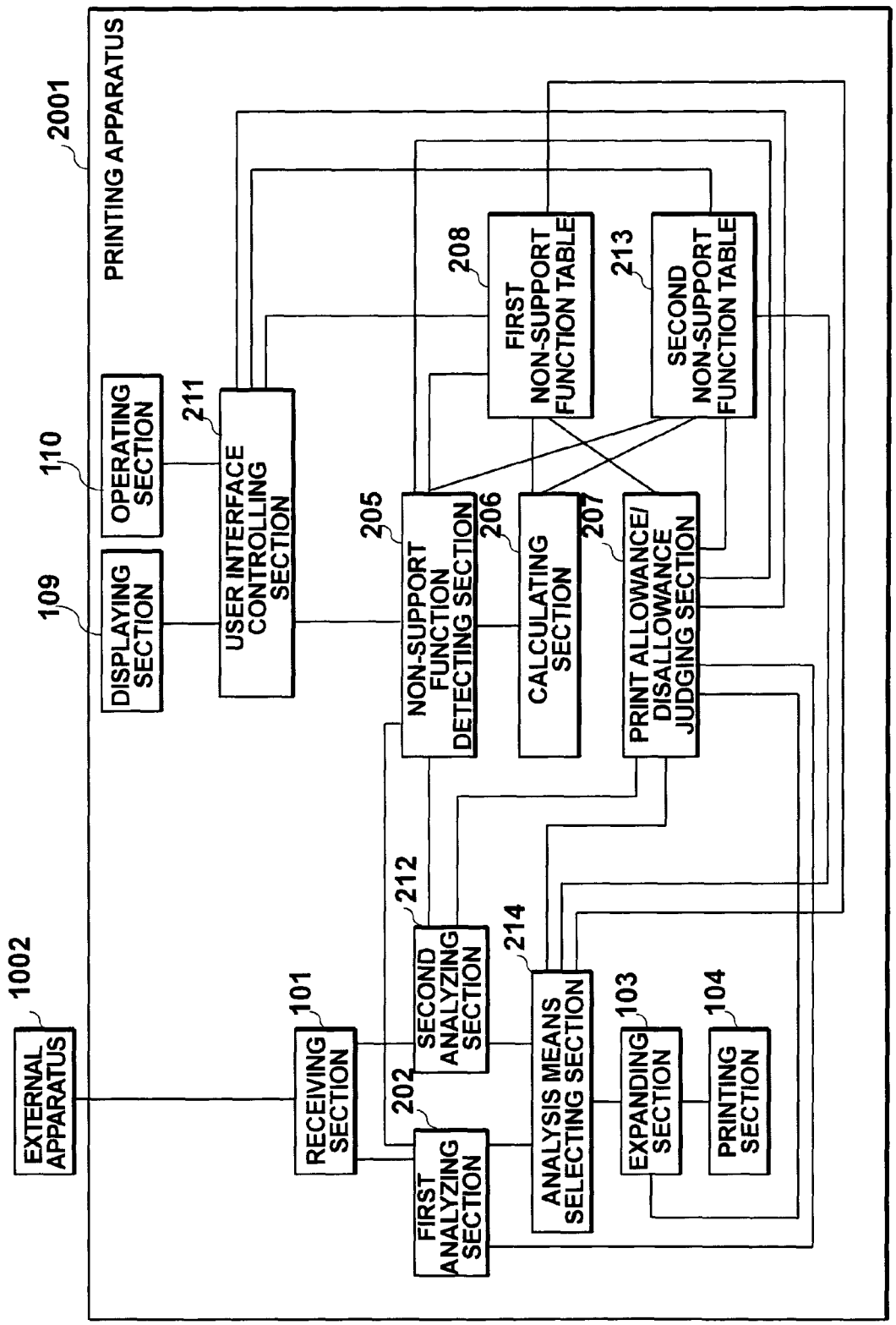

FIG.11A

| NOTIFICATION | NON-SUPPORT FUNCTION | COMMAND | THRESHOLD VALUE | TIME NUMBER |
|---|---|---|---|---|
| ON | FONT | SETFONT | 2 | 0 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG.11B

| NOTIFICATION | NON-SUPPORT FUNCTION | COMMAND | THRESHOLD VALUE | TIME NUMBER |
|---|---|---|---|---|
| ON | FONT | SETFONT | 2 | 3 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG.11C

| NOTIFICATION | NON-SUPPORT FUNCTION | COMMAND | THRESHOLD VALUE | TIME NUMBER |
|---|---|---|---|---|
| ON | FONT | SETFONT | 2 | 1 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG.11D

| NOTIFICATION | NON-SUPPORT FUNCTION | COMMAND | THRESHOLD VALUE | TIME NUMBER |
|---|---|---|---|---|
| ON | FONT | SETFONT | 2 | 3 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG.11E

| NOTIFICATION | NON-SUPPORT FUNCTION | COMMAND | THRESHOLD VALUE | TIME NUMBER |
|---|---|---|---|---|
| ON | FONT | SETFONT | 2 | 0 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG.12A

| NOTIFICATION | NON-SUPPORT FUNCTION | COMMAND | THRESHOLD VALUE | TIME NUMBER |
|---|---|---|---|---|
| ON | FONT | SETFONT | 2 | 0 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG.12B

| NOTIFICATION | NON-SUPPORT FUNCTION | COMMAND | THRESHOLD VALUE | TIME NUMBER |
|---|---|---|---|---|
| ON | FONT | SETFONT | 2 | 0 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG.12C

| NOTIFICATION | NON-SUPPORT FUNCTION | COMMAND | THRESHOLD VALUE | TIME NUMBER |
|---|---|---|---|---|
| ON | FONT | SETFONT | 2 | 3 |
| ON | DUPLEX PRINT | SETDUPLEX | 0 | 0 |
| ON | STAPLE | SETSTAPLE | 0 | 0 |
| OFF | PAPER SIZE | SETPAPERSIZE | 1 | 0 |

FIG. 13A

| | |
|---|---|
| | ... |
| L2001 | A4 SETPAPERSIZE |
| L2002 | TRUE SETDUPLEX |
| L2003 | Mincho SETFONT |
| L2004 | 50 800 MOVE (ABC) SHOW |
| L2005 | Gothic SETFONT |
| L2006 | 50 700 MOVE (DEF) SHOW |
| L2007 | Gothic-P SETFONT |
| L2008 | 50 600 MOVE (GHI) SHOW |
| L2009 | Gothic-I SETFONT |
| L2010 | 50 500 MOVE (JKL) SHOW |
| | ... |
| L2100 | EOF |

FIG. 13B

| | |
|---|---|
| | ... |
| L2101 | A4 SETPAPERSIZE |
| L2102 | TRUE SETDUPLEX |
| L2103 | Mincho SETFONT |
| L2104 | 50 800 MOVE (ABC) SHOW |
| L2105 | Mincho SETFONT |
| L2106 | 50 700 MOVE (DEF) SHOW |
| L2107 | Mincho SETFONT |
| L2108 | 50 600 MOVE (GHI) SHOW |
| L2109 | Gothic-I SETFONT |
| L2110 | 50 500 MOVE (JKL) SHOW |
| | ... |
| L2200 | EOF |

FIG.14A

- L2201 — A4 SETPAPERSIZE
- L2202 — TRUE SETDUPLEX
- L2203 — Mincho SETFONT
- L2204 — 50 800 MOVE (ABC) SHOW
- L2205 — Mincho-I SETFONT
- L2206 — 50 700 MOVE (DEF) SHOW
- L2207 — Mincho-I SETFONT
- L2208 — 50 600 MOVE (GHI) SHOW
- L2209 — Mincho-I SETFONT
- L2210 — 50 500 MOVE (JKL) SHOW
- L2300 — EOF

FIG.14B

- L2301 — A4 SETPAPERSIZE
- L2302 — TRUE SETDUPLEX
- L2303 — Mincho SETFONT
- L2304 — 50 800 MOVE (ABC) SHOW
- L2305 — Gothic-P SETFONT
- L2306 — 50 700 MOVE (DEF) SHOW
- L2307 — Gothic-P SETFONT
- L2308 — 50 600 MOVE (GHI) SHOW
- L2309 — Gothic-P SETFONT
- L2310 — 50 500 MOVE (JKL) SHOW
- L2400 — EOF

FIG.21A

THE FOLLOWING NON-SUPPORT FUNCTION IS
DETECTED IN THE FIRST ANALYZING SECTION.

1.FONT

PLEASE CONFIRM THE PRINT JOB.

FIG.21B

"CONSTRUCTION ERROR" IS DETECTED IN THE
FIRST ANALYZING SECTION.

PLEASE CONFIRM THE PRINT JOB.

PRINTING APPARATUS THAT DETECTS A NON-SUPPORTED FUNCTION

BACKGROUND OF THE INVENTION

1. Field of the Invention

The invention relates to a printing apparatus.

2. Related Background Art

In conventional printing apparatus, in the case that error occurs when an analyzing section analyzes received print job, the printing apparatus makes a displaying section display plural eliminating methods to eliminate the error so as to notify user. Then the user selects one eliminating method from the plural eliminating methods, after that, the printing apparatus executes the selected eliminating method to eliminate the error.

For example, in the case that command error occurs when the analyzing section analyzes print job, the printing apparatus makes the displaying section display two eliminating methods to eliminate the error.

One of the two eliminating methods is "to skip the command", and another of the two eliminating methods is "to skip the print job".

Then, the user selects one eliminating method from the two eliminating methods, and the printing apparatus executes the selected eliminating method to continue a print process again (refer to patent document 1).

Patent document 1: Japan patent publication H08-147122.

However, in the conventional printing apparatus, in the case that error occurs when the analyzing section analyzes the received print job, because there is always need for user to select eliminating method, it is troublesome and too heavy a burden for user.

SUMMARY OF THE INVENTION

It is, therefore, an object of the invention to provide a printing apparatus capable of solving the above problem.

According to the present invention, there is provided a printing apparatus which receives a print job, and performs a print on the basis of the print job, comprising a non-support function detecting section for detecting instruction to request to use non-support function which does not exist in the printing apparatus; a calculating section for calculating time number of detection regarding the instruction, detected by the non-support function detecting section; and a print allowance/disallowance judging section for judging whether the print of the print job is allowance or is disallowance on the basis of a calculation result of the time number calculated by the calculating section.

Effect of the Present Invention

According to the present invention, because a printing apparatus comprises a non-support function detecting section for detecting instruction to request to use non-support function being inexistent in the printing apparatus; a calculating section for calculating time number of detection regarding the instruction, detected by the non-support function detecting section; and a print allowance/disallowance judging section for judging whether the print of the print job is allowance or is disallowance on the basis of a calculation result of the time number calculated by the calculating section, through predetermining threshold value of print allowance/disallowance judgment, user does not need to select any eliminating method when error related to the non-support function occurred. Therefore, it is possible to lighten burden of user.

The above and other objects and features of the present invention will become apparent from the following detailed description and the appended claims with reference to the accompanying drawings.

BRIEF DESCRIPTION OF THE DRAWINGS

FIG. 2A is a first content explanatory diagram of a non-support function table in embodiment 1;

FIG. 2B is a second content explanatory diagram of a non-support function table in embodiment 1;

FIG. 3A is a first content explanatory diagram of a print job in embodiment 1;

FIG. 3B is a second content explanatory diagram of a print job in embodiment 1;

FIG. 8A is a first content explanatory diagram of message to user in embodiment 1;

FIG. 8B is a second content explanatory diagram of message to user in embodiment 1;

FIG. 9A is a first, explanatory diagram of a displaying section and an operating section in embodiment 1;

FIG. 9B is a second explanatory diagram of a displaying section and an operating section in embodiment 1;

FIG. 10 is a block diagram showing a structure of a printing apparatus in embodiment 2;

FIG. 11A is a content explanatory diagram (I) of a first non-support function table in embodiment 2;

FIG. 11B is a content explanatory diagram (II) of a first non-support function table in embodiment 2;

FIG. 11C is a content explanatory diagram (III) of a first non-support function table in embodiment 2;

FIG. 11D is a content explanatory diagram (IV) of a first non-support function table in embodiment 2;

FIG. 11E is a content explanatory diagram (V) of a first non-support function table in embodiment 2;

FIG. 12A is a content explanatory diagram (I) of a second non-support function table in embodiment 2;

FIG. 12B is a content explanatory diagram (II) of a second non-support function table in embodiment 2;

FIG. 12C is a content explanatory diagram (III) of a second non-support function table in embodiment 2;

FIG. 13A is a first content explanatory diagram (I) of a print job in embodiment 2;

FIG. 13B is a first content explanatory diagram (II) of a print job in embodiment 2;

FIG. 14A is a second content explanatory diagram (I) of a print job in embodiment 2;

FIG. 14B is a second content explanatory diagram (II) of a print job in embodiment 2;

FIG. 21A is a first content explanatory diagram of message to user in embodiment 2;

FIG. 21B is a second content explanatory diagram of message to user in embodiment 2;

DETAILED DESCRIPTION OF THE PREFERRED EMBODIMENTS

Embodiments of the invention will be described in detail hereinbelow with reference to the drawings.

[Embodiment 1]

Explain of the Construction

Figure 1:
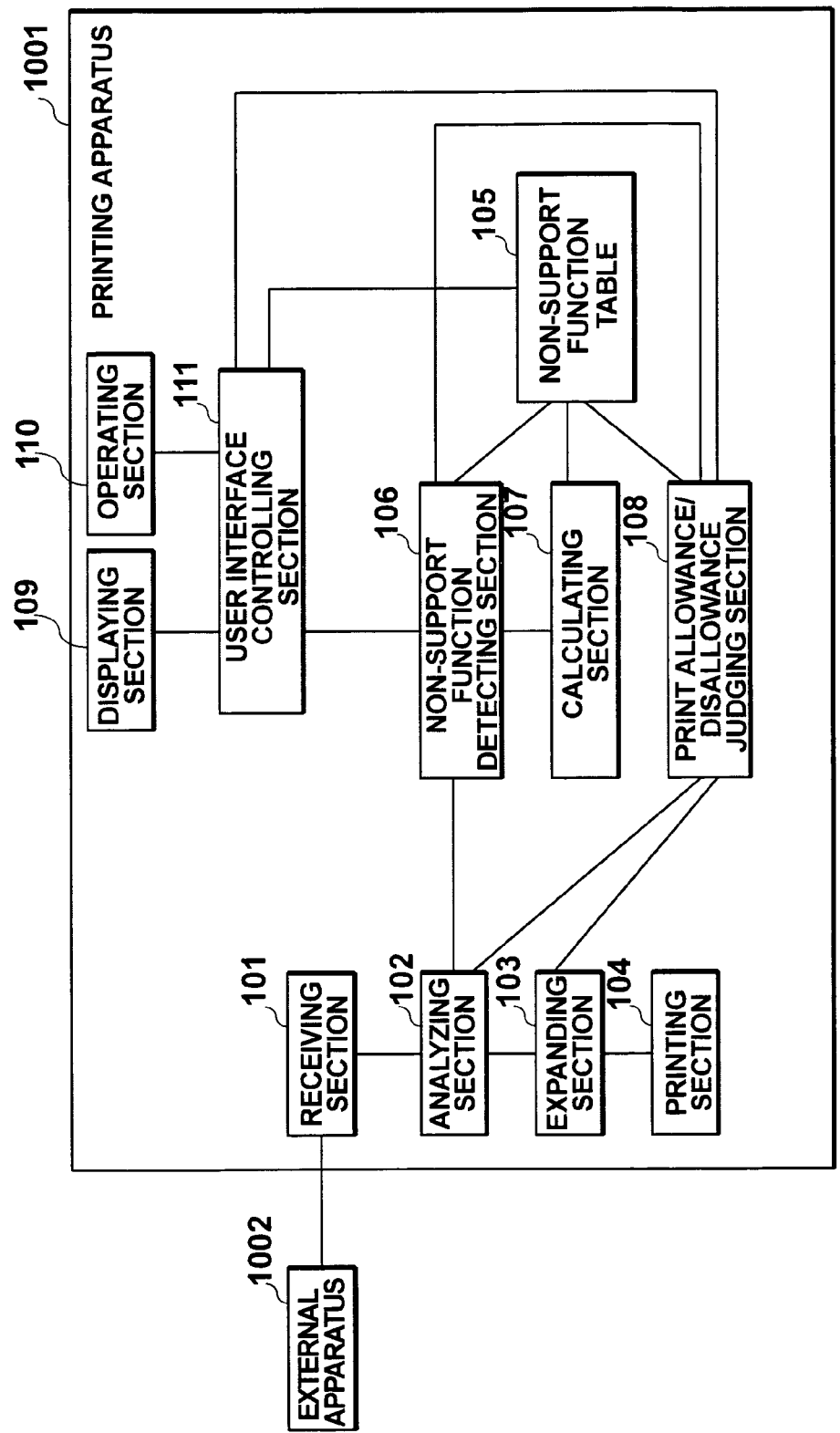
FIG. 1 is a block diagram showing a structure of a printing apparatus in embodiment 1.

FIG. 1 is a block diagram showing a structure of a printing apparatus in embodiment 1.

As shown by FIG. 1, a printing apparatus 1001 in embodiment 1 comprises a receiving section 101, an analyzing section 102, an expanding section 103, a printing section 104, a non-support function table 105, a non-support function detecting section 106, a calculating section 107, a print allowance/disallowance judging section 108, a display section 109, and an operating section 110.

The receiving section 101 is a part to receive print job from an external apparatus 1002 connected with LAN (Local Area Network) or USB cable.

The analyzing section 102 is a part that analyzes the print job received by the receiving section 101; and changes the analyzed print data into middle data.

Further, the analyzing section 102 is also a part having eliminating method when command of the analyzed print job is beyond the range of spec of the printing apparatus 1001.

The following is to explain how the analyzing section 102 analyzes the command.

The analyzing section 102 abstracts command from the print job received by the receiving section 101; and performs analysis of the command by using command processing portions provided in the analyzing section 102.

For example, a SETPAPERSIZE command processing portion interprets a character string which is set in a position ahead of "SETPAPERSIZE" command via space as a parameter character string.

As the parameter character string, a character string representing a paper size "A4", "B4" or the like is set.

For example, a SETSTAPLE command processing portion interprets a character string which is set in a position ahead of "SETSTAPLE" command via space as a parameter character string.

As the parameter character string, a character string of "TRUE" representing "execution" or "FALSE" representing "non-execution" is set.

For example, a SETDUPLEX command processing portion interprets a character string which is set in a position ahead of "SETDUPLEX" command via space as a parameter character string.

As the parameter character string, a character string of "TRUE" representing "execution" or "FALSE" representing "non-execution" is set.

For example, a SETFONT command processing portion interprets a character string which is set in a position ahead of "SETFONT" command via space as a parameter character string.

As the parameter character string, a character string is set to correspond to a font of "Gothic" representing "Gothic type", of "Mincho" representing "Mincho type" or the like.

For example, a MOVE command processing portion interprets X and Y coordinates that are set in a position ahead of "MOVE" command via space as a parameter character string.

As the parameter character string, for example, coordinates data such as "50 800" is set.

For example, a SHOW command processing portion interprets character string to be printed, which is described in parentheses and is in a position ahead of "SHOW" command as a parameter character string.

As the parameter character string, for example, a character string such as "ABC" is set.

Further, the SHOW command processing portion interprets that a character string will be printed on the X and Y coordinates that are described in the same line and specified by the MOVE command processing portion through using a font which is described in the front line and interpreted by the SETFONT command processing portion.

For example, an EOF command processing portion interprets description of "EOF" as an end character of the print job; and instructs to finish the print job.

The analyzing section 102, by using the respective processing portions mentioned above, executes interpretation of command from beginning of the print job to "EOF" command representing end of the print job.

On the one hand, when undefined character string is detected in a parameter character string by any of processing portions, or in the case that non-processable command exists because corresponding processing portion is not set, the analyzing section 102 sets that the corresponding command is "construction error" command.

On the other hand, the analyzing section 102 has a command replacing portion (i.e. SETFONT command replacing portion) which, in the case that a command including non-executable parameter character string is detected by any of respective processing portions, sets the command as a command beyond spec range (as non-support function), and replaces command beyond spec range into substitutable parameter character string so as to make an executable command.

For example, in the SETFONT command processing portion, a command of "Gothic SETFONT" to specify a font of "Gothic type" as a parameter character string is detected. However, in the SETFONT command processing portion, "Mincho type" is registered, but "Gothic type" is not registered. Therefore, the SETFONT command replacing portion replaces the command of "Gothic SETFONT" into the command of "Mincho SETFONT" in order to replace the specified font of "Gothic type" into the registered font of "Mincho type".

On the one hand, the analyzing section 102 performs command analysis. If a "construction error" occurs, the analyzing section 102 makes print stop. In the case, the analyzing section 102 does not change print job into middle data.

On the other hand, the analyzing section 102, if a command including non-executable parameter character string is detected, replaces the detected command with a substitute command as a substituting means; and generates middle data.

Regarding "construction error" and "non-support function", they will be explained below with example.

In the following description, regarding such command which is not able to be analyzed by the analyzing section 102, it is mentioned as "construction error" command. Further, regarding such command which is able to be analyzed by the analyzing section 102 but is concerning with function beyond spec range, it is mentioned as "non-support function" command.

For example, in the case that command of "TRUE SETPUNCH" representing a request to punch a hole in medium is included in print job, if SETPUNCH command processing portion does not exist in the analyzing section 102, it corresponds to "construction error".

Further, in the case that "0" or "1" is specified as a parameter character string instead of "true", it also corresponds to "construction error".

Furthermore, in the case that command of "TRUE SETSTAPLE" representing a request to staple medium is included in print job, even if SETSTAPLE command processing portion exists in the analyzing section 102 and parameter character string of "TRUE" is correct, if printing apparatus does not have a function to staple, it corresponds to a request of "non-support function".

The expanding section 103 is a part to generate print data from middle data generated by the analyzing section 102.

The printing section 104 is a part to print the print data generated by the expanding section 103 on medium.

The non-support function table 105 is a table to store information corresponding to items of "Notification", "Non-support function", "Command", "Threshold value" and "Time number", respectively.

The following will explain about the content through using the drawings.

FIG. 2A is a first content explanatory diagram of a non-support function table in embodiment 1; and FIG. 2B is a second content explanatory diagram of a non-support function table in embodiment 1.

"ON" or "OFF" of the item of "Notification" is set by user.

In the case that "Non-support function" command is detected, "ON" represents that the command is concerning with "Non-support function" which needs to be notified the calculating section 107.

In the case that "Non-support function" command is detected, "OFF" represents that the command is concerning with "Non-support function" which does not need to be notified the calculating section 107.

The user performs setting of "ON/OFF" of the item of "Notification" through operating the operating section 110 while looking display contents on the displaying section 109.

"Non-support function" is an analyzable function by the analyzing section 102 (includes functions of page description language and its own functions of apparatus), but can not be executed by the printing apparatus.

For example, as shown in FIG. 2, in the embodiment, as "Non-support function", that are set into "font" (e.g. Gothic, it corresponds to a command of "Gothic SETFONT"), "duplex print" (it corresponds to a command of "TRUE SETDUPLEX"), "staple" (it corresponds to a command of "TRUE SETSTAPLE") and "paper size" (e.g. A3, it corresponds to a command of "A3 SETPAPERSIZE") to correspond to the item of "Non-support function".

In the item of "Threshold value", value for judging "print allowance/disallowance" in the print judging section 108 is described.

In the case that the time number of "Non-support function" detected by the non-support function detecting section 106 (mentioned below) exceed "Threshold value", the print allowance/disallowance judging section 108 judges that the print of the sent print job is disallowance.

Through user operates the operating section 110 while looking a display contents of the display section 109, it is possible to change the "Threshold value" by an integer value of 0 or over 0.

The item of "Time number" indicates time number detecting "Non-support function" by the non-support function detecting section 106.

FIG. 2A is a first content explanatory diagram of a non-support function table in embodiment 1; and FIG. 2B is a second content explanatory diagram of a non-support function table in embodiment 1.

The following is to return to FIG. 1, and explains a structure of the printing apparatus 1001 in the embodiment 1.

In the case that the command analyzed by the analyzing section 102 includes "Non-support function", the non-support function detecting section 106 confirms whether it is "ON" or not in the term of "Notification" to correspond to the command through referring to the non-support function table 105.

If the "Notification" is "ON", the non-support function detecting section 106 notifies the calculating section 107 of detecting the command of the "non-support function".

Moreover, the non-support function detecting section 106 has a switch function to notify or not to notify the calculating section 107 of the detected "Non-support function".

For example, in the case that print job including command of "TRUE SETSTAPLE" for requesting to staple is sent to the printing apparatus 1001, if the analyzing section 102 can analyze the command, but the printing apparatus 1001 does not have a mechanism of stapling, the command of "SETSTAPLE" is concerning with a non-support function.

Further, because the item of "Notification" corresponding to the "SETSTAPLE" in the non-support function table 105 is "ON", the non-support function detecting section 106 notifies the calculating section 107 of detecting the "Non-support function".

The calculating section 107, when the detection of the command of "Non-support function" is notified from the non-support function detecting section 106, adds "1" to the "Time number" corresponding to the detected command in the non-support function table 105.

That is, whenever the command of "Non-support function" is detected, "1" is added to the "Time number" in FIG. 2.

The print allowance/disallowance judging section 108 confirms whether the time number of detecting the non-support function is a predetermined threshold value or over through referring the non-support function table 105; and judges that the print is disallowance if the time number is the threshold value or over.

Further, the print allowance/disallowance judging section 108 notifies the user that the print is disallowed through displaying list of the detected "Non-support function" on the displaying section 109 or through printing an error report.

Furthermore, the print allowance/disallowance judging section 108 has a setting of notice method for notifying user.

In order to make the print allowance/disallowance judging section 108 have the setting of notice method, it is possible to display "display" or "report print" on the display section 109 so as to make user select through operating the operating section 110.

The displaying section 109 is a part to display setting menu of the printing apparatus 1101, state of the printing apparatus 1101 such as error, warning, in printing or the like, and instruction for user with text, figure or image.

The operating section 110 is composed of plural buttons.

The user, through pressing these buttons, performs instructions to display the setting menu of the printing apparatus 1101 on the displaying section 109, to change setting value, to decide the change of the setting value, or to cancel the change of the setting value.

A user interface controlling section 111 is a part that detects the pressed button in the operating section 110; and controls the display section 109 to display message and menu corresponding to the pressed button.

Further, the user interface controlling section 111 accesses the non-support function table 105; and deals with request from the user for changing "ON" or "OFF" of the item of "Notification" or for changing value of the item of "Threshold value".

The printing apparatus 1101 in the embodiment 1 explained above operates as follows.

Explanation of the Operation

First, content of print job used in the following operation explanation will be explained.

FIG. 3A is a first content explanatory diagram of a print job in embodiment 1; and FIG. 3B is a second content explanatory diagram of a print job in embodiment 1.

Here, FIG. 3A will be explained.

As shown in FIG. 3A, line L1001 of the print job specifies a paper size of A4.

Line L1002 specifies a duplex print.

Line L1003 specifies a font of "Mincho."

Line L1004 specifies to output a character string of "ABC" at a location of (50, 800) in the case that the lower left of medium is regarded as the origin (0, 0).

Moreover, a unit of location is point, and 72 points correspond to 1 inch.

Line L1005 specifies a font of "Gothic."

Line L1006 specifies to output a character string of "DEF" at a location of (50, 700).

Line L1007 specifies a font of "Gothic-P."

Line L1008 specifies to output a character string of "GHI" at a location of (50, 600).

Line L1009 specifies a font of "Gothic-I."

Line L1010 specifies to output a character string of "JKL" at a location of (50, 500).

Line L1100 represents the end of the print job.

Figure 4:
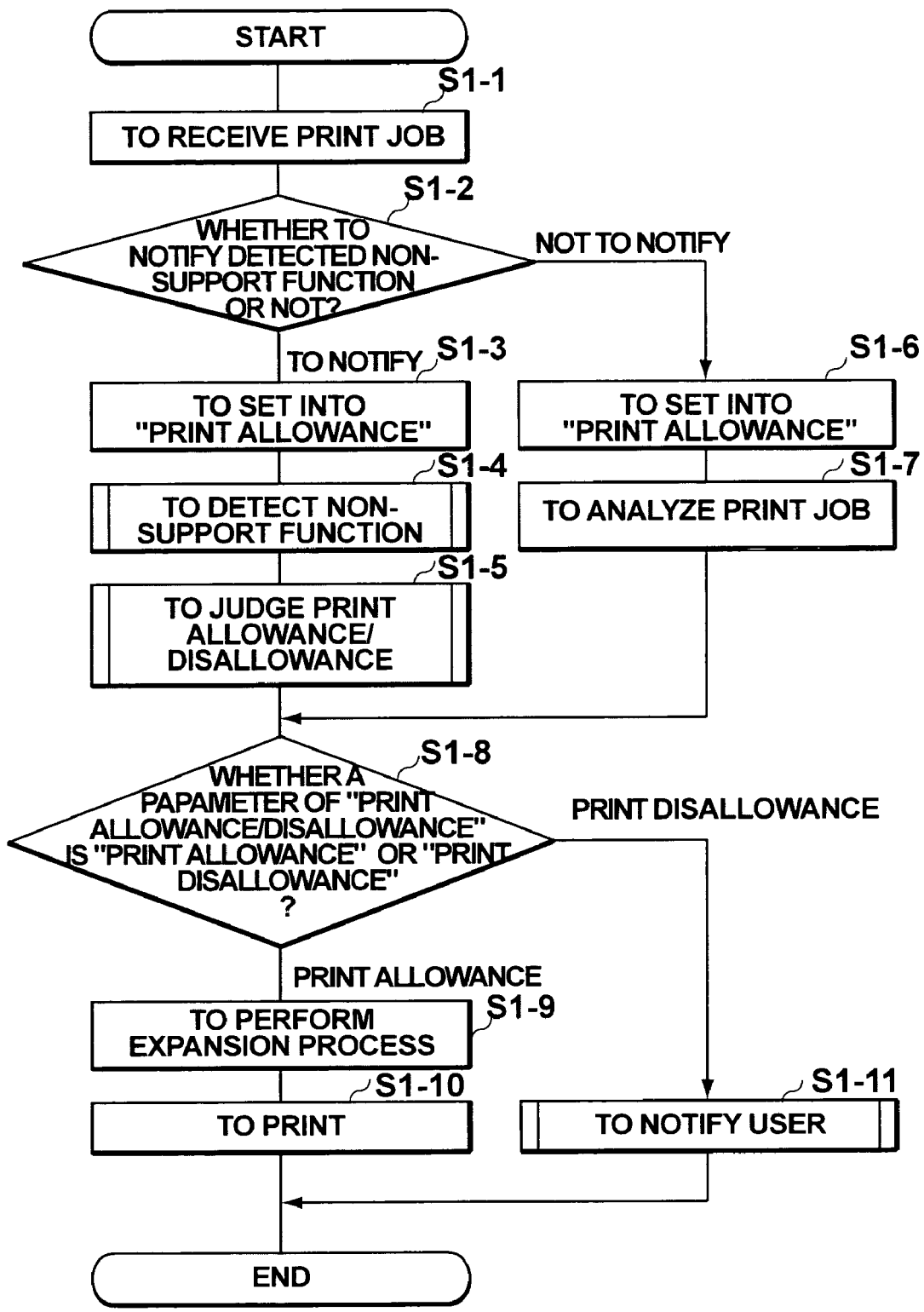
FIG. 4 is a flowchart for showing print process of a printing apparatus in embodiment 1.

FIG. 4 is a flowchart for showing print process of a printing apparatus in embodiment 1.

The flowchart represents the summary of the whole operation of the printing apparatus 1001.

First, it will be explained from step S1-1 to step S1-11 together with FIG. 1 according to a step order, next, about step to be explained in detail, it will be explained in detail through using other flowchart.

Step S1-1

The receiving section 101 receives a print job (FIG. 3A) from the external apparatus 1002 connected with LAN (Local Area Network) or USB cable.

Step S1-2

The analyzing section 102 confirms a notice setting of "non-support function" stored in the non-support function detecting section 106.

That is, the analyzing section 102 asks the non-support function detecting section 106 regarding the notice setting, and judges whether to "notify" or "not notify" the calculating section 107, in the case that "Non-support function" is detected from command of print job.

In the case that the notice setting stored in the non-support function detecting section 106 is "notify", the step S1-3 is started; in the case that it is "not notify", the step S1-6 is started.

Here, regarding the notice setting, it is obtained through user operates the operating section 110 in advance to shift menu executing the notice setting; makes the displaying section 109 display "whether notify the detected non-support function or not"; and presses button of the operating section 110 so as to select setting.

The selection result of the notice setting is stored in the non-support function detecting section 106.

Step S1-3

The print allowance/disallowance judging section 108 sets the item of "print allowance/disallowance" into "print allowance" as an initiative setting.

Step S1-4

The non-support function detecting section 106 detects a "Non-support function" while command is being analyzed.

Regarding operation flow of the non-support function detecting section 106, details will be explained later.

Step S1-5

The print allowance/disallowance judging section 108 performs a judgment of "print allowance/disallowance". Regarding operation flow of the print allowance/disallowance judging section 108, details will be explained later.

Step S1-6

The print allowance/disallowance judging section 108 initializes the item of "print allowance/disallowance" so as to set an initiative setting of "print allowance".

Step S1-7

The analyzing section 102 analyzes the print job and generates middle data.

After finished analyzing till the end on line L1100 of the print job, the step S1-8 is started. Here, if "construction error" occurs in analyzing, the analyzing section 102 stops the analysis.

Step S1-8

The print allowance/disallowance judging section 108 confirms the item of "print allowance/disallowance". Because it is "print allowance", the step S1-9 is started. However, in the case that it is "print disallowance" in the step S1-5, the step S1-11 is started.

Step S1-9

The expanding section 103 expands the middle data changed by the analyzing section 102; and generates print data.

In the case that "construction error" is detected in the step S1-7, the expansion process is not performed because the middle data is not generated.

Step S-10

The printing section 104 prints the print data generated in the step S1-9 on medium, and the flow is finished.

Step S1-11

The analyzing section 102, in the case that the analysis is stopped because of the occurrence of the "construction error" in analyzing in the step S1-7, prints error report, or displays error report on the displaying section 109 to notify user of the error, and the flow is finished.

Regarding the flow of notifying user of the error occurrence, details will be explained later.

Next, regarding the step S1-4, the step S1-5 and the step S1-11 in the above flowchart, details will be explained per step through using respective flowcharts.

Figure 5:
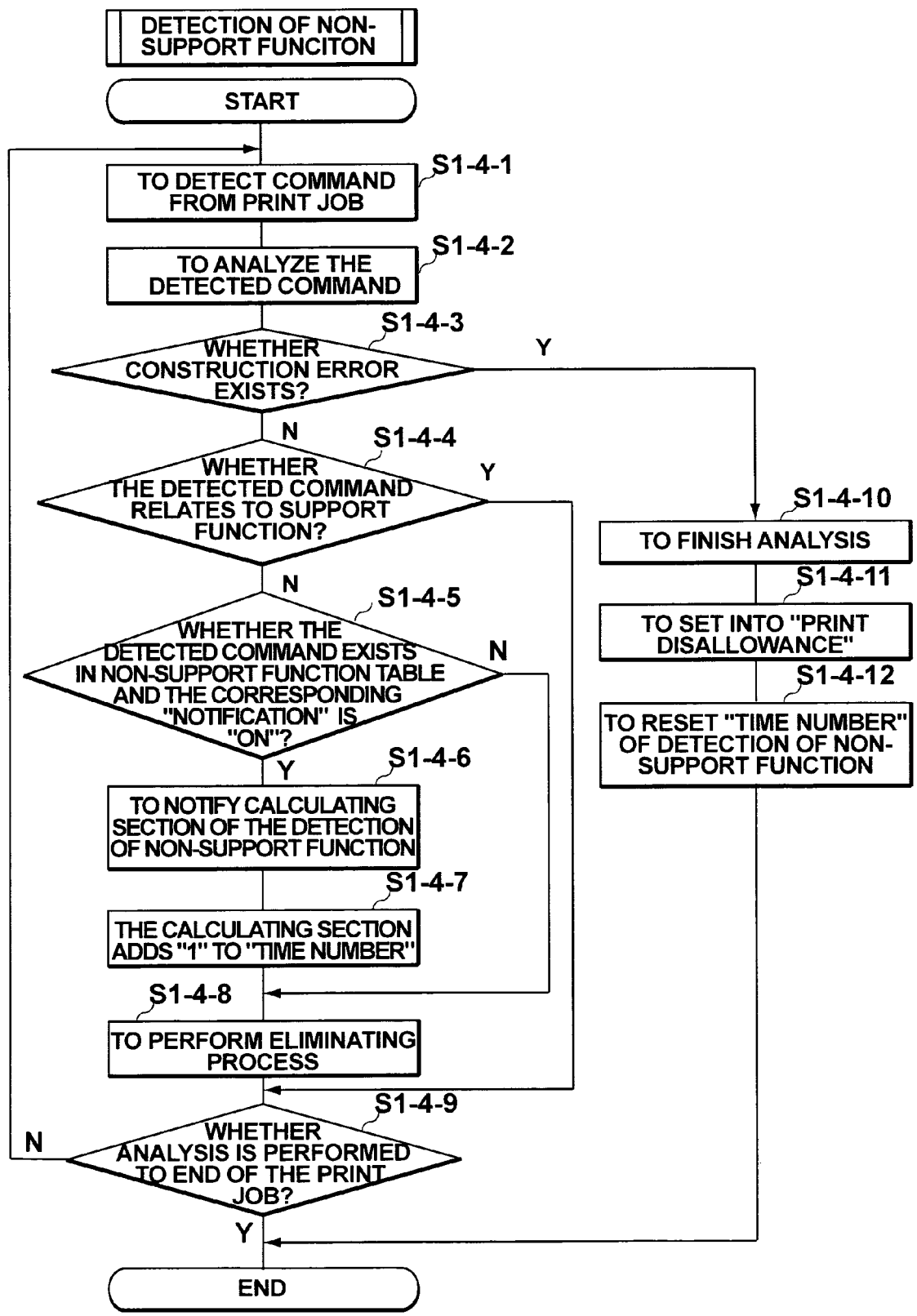
FIG. 5 is a flowchart for explaining in detail a detection flow (S1-4) of non-support function in embodiment 1.

FIG. 5 is a flowchart for explaining in detail a detection flow (S1-4) of non-support function in embodiment 1.

Regarding operation of the non-support function detecting section 106, details will be explained from step S1-4-1 to step S1-4-12 together with FIG. 1 according to a step order.

Step S1-4-1

The analyzing section 102 detects command and parameter character string from the print job (FIG. 3A) received by the receiving section 101.

Step S1-4-2

The analyzing section 102 analyzes the detected command and the detected parameter character string in the step S1-4-1.

Step S1-4-3

The analyzing section 102 confirms whether "construction error" exists or not. If the "construction error" is not detected, the step S1-4-4 is started; if it is detected, the step S1-4-10 is started.

Step S1-4-4

The analyzing section 102 confirms whether the command is within spec range of the printing apparatus 1001 or not. If the command is within spec range, the step S1-4-9 is started; if it is beyond spec range, the step S1-4-5 is started.

Step S1-4-5

The analyzing section 102 confirms that the command beyond spec range exists in the non-support function table 105 of the printing apparatus 1001 as "Non-support function", and also confirms whether the item of "Notification" in the non-support function table 105 is "ON" or not.

If it is "ON", the step S1-4-6 is started; if it is "OFF", the step S1-4-8 is started.

Step S1-4-6

The non-support function detecting section 106 notifies the calculation section 107 of the detection of "Non-support function".

Step S1-4-7

The calculation section 107 adds "1" to the "Time number" in the non-support function table 105.

Step S1-4-8

The analyzing section 102 performs an error eliminating process according to the eliminating method provided previously.

Step S1-4-9

The analyzing section 102 confirms whether the analysis is performed till the end line on L1100 of the print job or not.

If the analysis of the analyzing section 102 is not completed to the end of the print job, the flow returns to step S1-4-1; if the analysis is completed to the end of the print job, the flow is finished.

Step S1-4-10

In the above step S1-4-3, in the case that the analyzing section 102 detects "construction error" in command of the print job, the analyzing section 102 finishes the analysis process.

Step S1-4-11

The analyzing section 102 notifies the print allowance/disallowance judging section 108 that the "construction error" is detected, and the print allowance/disallowance judging section 108 sets the parameter of "print allowance/disallowance" into "print disallowance".

Step S1-4-12

The analyzing section 102 notifies the non-support function detecting section 106 of the "construction error".

The non-support function detecting section 106 notifies the calculating section 107 of the "construction error", then, the calculating section 107 resets all of the item of "Time number" in the non-support function table 105 to "0", and the flow is finished.

Here, as a concrete example, a flow will be explained in the case that print job shown as FIG. 3A is received, through applying the print job to the flowchart shown as FIG. 5.

With respect to line L1001 of the print job (FIG. 3A), the analyzing section 102 detects command "SETPAPERSIZE" and A4 as a parameter character string of the command "SETPAPERSIZE" (step S1-4-1).

The analyzing section 102 confirms whether the command "SETPAPERSIZE" (i.e. A4 SETPAPERSIZE) exists as a command of page description language, and also confirms whether the parameter character string represents paper size or not (step S1-4-2).

The analyzing section 102, because it is possible to print on A4 paper in the printing apparatus 1001, judges that the command is concerning with a support function.

Following the command of "A4 SETPAPERSIZE", the respective commands are sequentially analyzed.

Here, for example, the printing apparatus 1001 has "Mincho" font and "Mincho-I" font as usable fonts.

In command execution of line L1003 of print job, when the analyzing section 102 judges that the "Mincho" font is founded and "SETFONT" command can be supported, the step S1-4-9 is started to continue the step S1-4-4.

In command execution of line L1005 of print job, in the case that the analyzing section 102 judges the "Gothic" font cannot be used as a parameter character string, the step S1-4-5 is continued from the step S1-4-4.

The non-support function detecting section 106 confirms whether "SETFONT" (i.e. "Gothic SETFONT") command exists in the item of "Command" of the non-support function table 105.

Because the "SETFONT" command exists, further, the non-support function detecting section 106 confirms whether the item of "Notification" related to the command is "ON" or not (step S1-4-5).

In the step S1-4-5, because the "SETFONT" command exists in the "Command" of the non-support function table 105 and the item of "Notification" related to the command is "ON", the step S1-4-6 is started.

Here, the non-support function detecting section 106 notifies the calculation section 107 that the "SETFONT" command as "Non-support function" is detected (step S1-4-6).

The calculation section 107 adds "1" to "time number" related to the "SETFONT" command in the non-support function table 105 (step S1-4-7).

The analyzing section 102 performs error eliminating process of the "SETFONT" command according to eliminating method which is provided previously (step S1-4-8).

The error eliminating process is to replace the "Gothic" font into font previously stored in the printing apparatus 1001. That is, here, the font of "Gothic type" is replaced into the font of "Mincho type".

After the analyzing section 102 performed the same process to analyze print job (FIG. 3A) till line L1100, the non-support function table 105 is changed from FIG. 2A to FIG. 2B. As shown by FIG. 2B, the time number of "SETFONT" command is replaced with three times.

Figure 6:
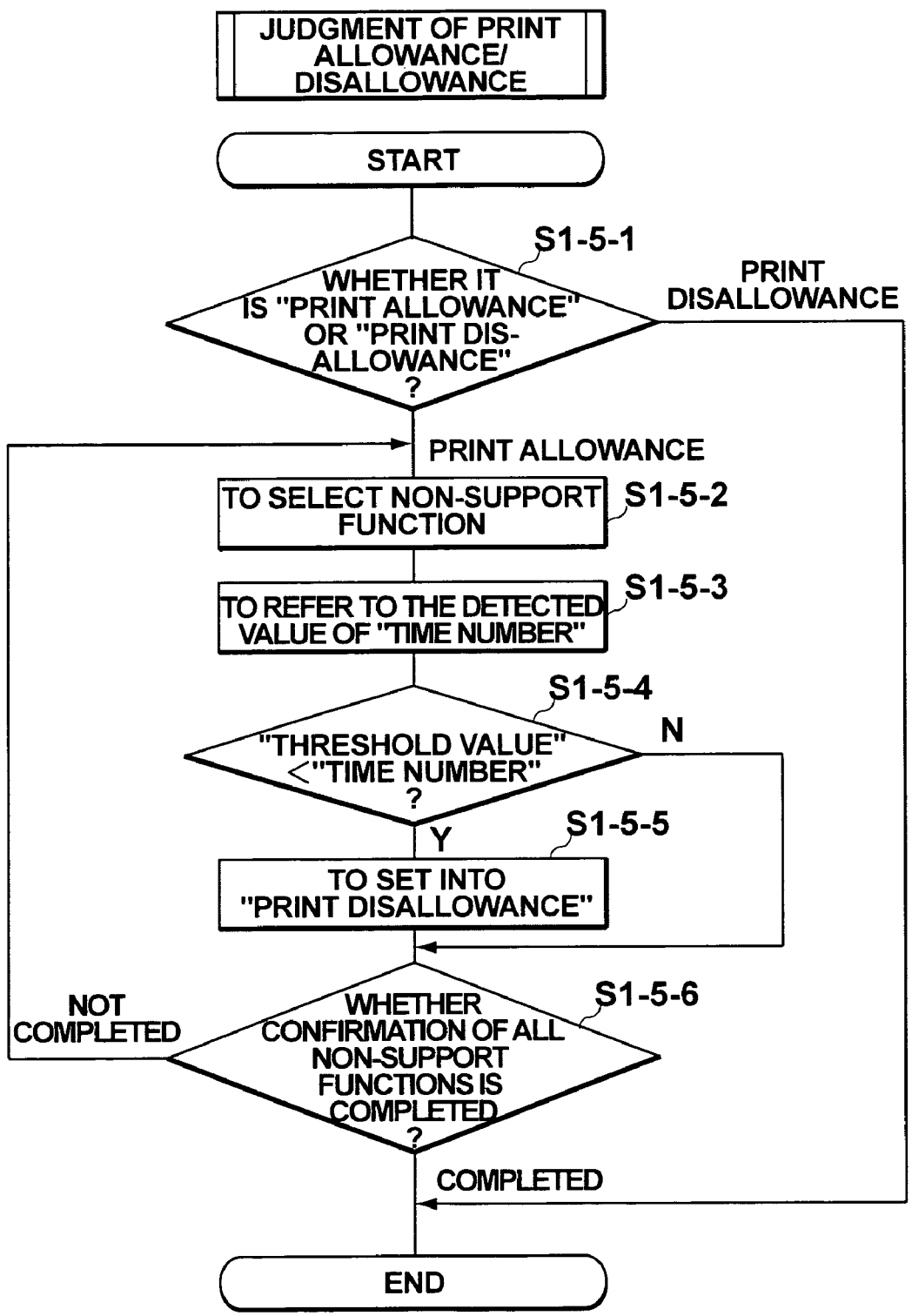
FIG. 6 is a flowchart for explaining in detail a print allowance/disallowance judgment flow (S1-5) in embodiment 1.

FIG. 6 is a flowchart for explaining in detail a print allowance/disallowance judgment flow (S1-5) in embodiment 1.

Regarding operation of the print allowance/disallowance judging section 108, details will be explained from step S1-5-1 to step S1-5-6 together with FIG. 1 according to a step order.

Step S1-5-1

The print allowance/disallowance judging section 108 confirms the parameter of "print allowance/disallowance" existing inside. If the parameter of "print allowance/disallowance"

is "print disallowance", the flow is finished; if it is "print allowance", the step S1-5-2 is started.

Step S1-5-2

The print allowance/disallowance judging section 108 selects "Non-support function" in the non-support function table 105.

Step S1-5-3

The print allowance/disallowance judging section 108 refers to a value of "Time number" related to the selected "Non-support function" in the non-support function table 105.

Step S1-5-4

The print allowance/disallowance judging section 108 compares the referred value of "Time number" with a value of "Threshold value" related to the item of "Time number" in the non-support function table 105.

If the value of the "Time number" is bigger than the "Threshold value", the step S1-5-5 is started; if not, the step S1-5-6 is started.

Step S1-5-5

The print allowance/disallowance judging section 108 sets the parameter of "print allowance/disallowance" into "print disallowance".

Step S1-5-6

In the case that all "non-support function" are confirmed, the flow is finished; if they are not, the step S1-5-2 to the step S1-5-6 are repeated.

Here, as a concrete example, the case that the non-support function table is shown as FIG. 2B will be explained.

In the step S1-5-4, because the value of "Threshold value" is "2" and the value of "Time number" is "3", the step S1-5-5 is started.

Accordingly, in the step S1-5-5, the print allowance/disallowance judging section 108 sets the parameter of "print allowance/disallowance" into "print disallowance".

Figure 7:
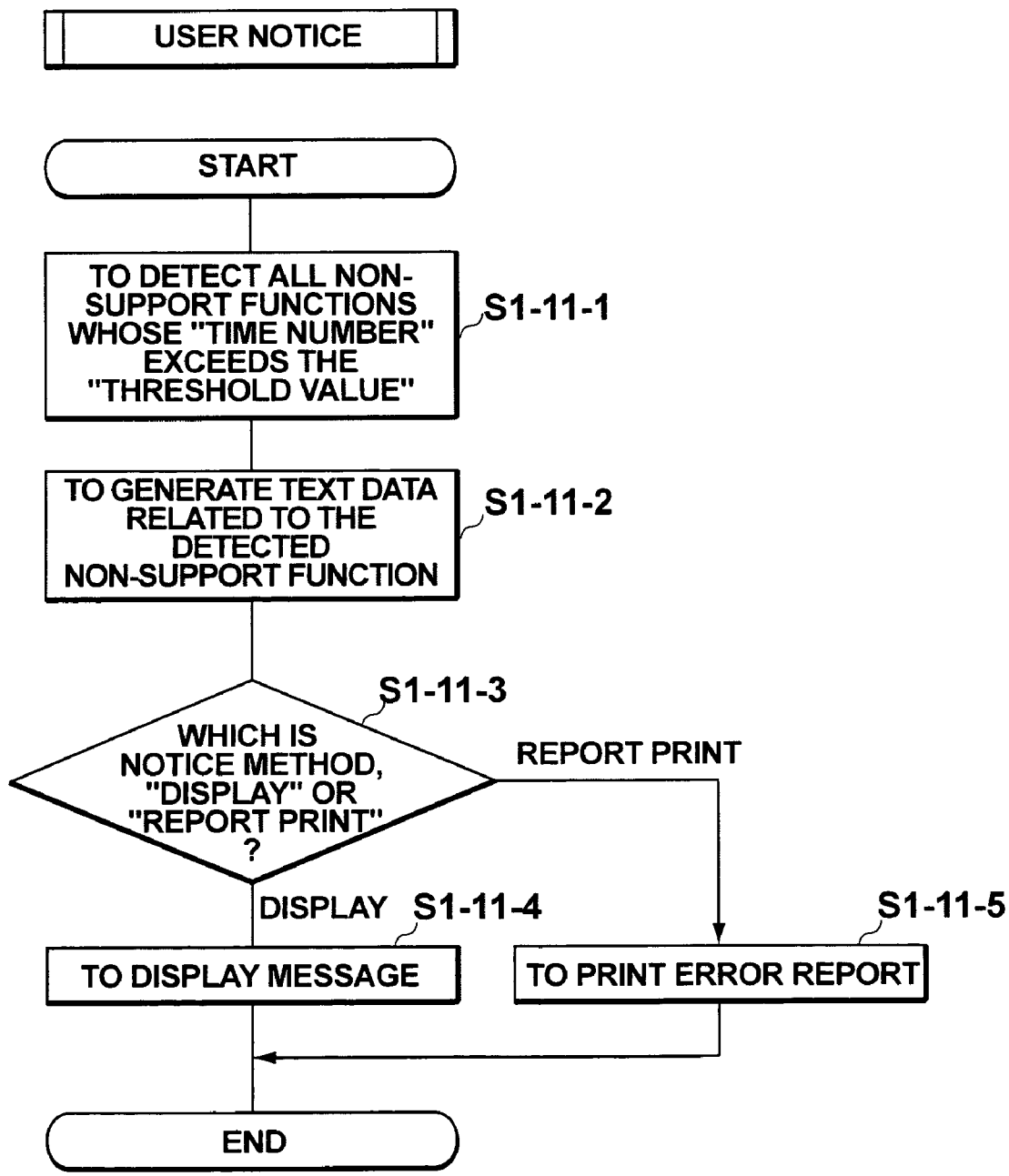
FIG. 7 is a flowchart for explaining in detail a user notice flow (S1-11) in embodiment 1.

FIG. 7 is a flowchart for explaining in detail a user notice flow (S1-11) in embodiment 1.

Regarding operation of the user notice flow (S1-11), details will be explained from step S1-11-1 to step S1-11-5 together with FIG. 1 according to a step order.

Here, as a concrete example, the case that the non-support function table is shown as FIG. 2B will be explained.

First, content of user message in the user notice flow (S1-11) is explained.

FIG. 8A is a first content explanatory diagram of message to user in embodiment 1; and FIG. 8B is a second content explanatory diagram of message to user in embodiment 1.

As shown by FIG. 8A and FIG. 8B, as an example, the message to user includes a content to notify that "Non-support function" is detected (FIG. 8A) or a content to notify that "construction error" is detected (FIG. 8B).

Returning to FIG. 7, operation of the user notice flow (S1-11) will be explained.

Step S1-11-1

The print allowance/disallowance judging section 108 detects "Non-support function" whose "Time number" exceeds the "Threshold value" in the non-support function table 105.

However, in the case that "construction error" is detected in the step S1-4-3, print becomes unnecessary.

Step S1-11-2

The print allowance/disallowance judging section 108 generates text data shown as FIG. 8A through adding message to the "Non-support function" detected in the step S1-11-1.

Moreover, in the case that "construction error" is detected in the step S1-4-3, the print allowance/disallowance judging section 108 generates such text data as shown by FIG. 8B.

Step S1-11-3

The print allowance/disallowance judging section 108 confirms the notice method to user, which previously set in the print allowance/disallowance judging section 108.

If the notice method is "report print", the step 1-11-5 is started; if it is "display", the step 1-11-4 is started.

Step S1-11-4

The print allowance/disallowance judging section 108 deletes the middle data changed by the analyzing section 102; and sends the text data generated in the step S1-11-2 to the user interface controlling section 111.

The user interface controlling section 111 displays the text data on the displaying section 109, and the flow is finished.

Step S1-11-5

The print allowance/disallowance judging section 108 deletes the middle data changed by the analyzing section 102; generates page of format shown as FIG. 8A and FIG. 8B from the text data generated in the step S1-11-2; and sends the page data to the analyzing section 102.

The analyzing section 102 performs analysis and changes the page data into middle data.

The expanding section 103 generates print data from the middle data.

The printing section 104 prints the print data on medium to notify user of error report, and the flow is finished.

Here, as a concrete example, the following is to explain the case that the non-support function table becomes that shown by FIG. 2B.

In FIG. 2B, the "font (Gothic)" corresponds to the step S1-11-1.

As a result, a message as shown by FIG. 8A is notified the user.

Next, operation of setting change of the non-support function table 105 will be explained.

FIG. 9A is a first explanatory diagram of a displaying section and an operating section in embodiment 1; and FIG. 9B is a second explanatory diagram of a displaying section and an operating section in embodiment 1.

First, the user presses plurally a button 115, a button 116, a button 117 and a button 118 of the operating section 110 to obtain a scene shown by FIG. 9A.

Next, the user selects "non-support function table edit"; and presses a button 119 to display a scene shown by FIG. 9B.

The user moves cursor to corresponding item when user hopes to change through pressing the button 115, the button 116, the button 117 and the button 118.

In FIG. 9B, the cursor is moved to the item of the "Threshold value" of font related to "Non-support function".

After pressing the button 119 once to select the "Threshold value", the user presses plurally the button 116 or the button 117 to change the "Threshold value" into an optional positive integer value.

Further, the user presses the button 119 to set the changed value.

In the case that the item to be changed is "Notification", through using the button 116 and the button 117, "ON" or "OFF" is selectively set.

Explanation of the Effect

As explained above, in the embodiment, because process of print job is stopped when error occurs over a predetermined time number, it is possible to cancel unnecessary print, further, because the error is automatically eliminated on the basis of a predetermined condition, it is possible to reduce user's burden.

[Embodiment 2]

FIG. 10 is a block diagram showing a structure of a printing apparatus in embodiment 2.

As shown by FIG. 10, a printing apparatus 2001 in embodiment 2 comprises a receiving section 101, a first analyzing section 202, a second analyzing section 212, an analysis means selecting section 214, an expanding section 103, a printing section 104, a non-support function detecting section 205, a calculating section 206, a print allowance/disallowance judging section 207, a first non-support function table 208, a second non-support function table 213, a user interface controlling section 211, a display section 109, and an operating section 110.

The following is only to explain the part different from the embodiment 1, the same symbols are assigned and their explanations are omitted.

The first analyzing section 202 is a part that analyzes the print job received by the receiving section 101; and generates middle data.

Further, the first analyzing section 202 is also a part which has an eliminating method used when an analyzed command of the analyzed print job is beyond spec range of the printing apparatus 2001.

In the following description, function is mentioned as "construction error", which is requested by a command that can not be analyzed by the first analyzing section 202 and the second analyzing section 212. Further, function is mentioned as "non-support function", which is beyond spec range, and is requested by a command that can be analyzed by the first analyzing section 202 and the second analyzing section 212 but can not be executed.

For example, in the case that a print job including a command of "TRUE SETPUNCH" for requesting to punch a hole in a medium is sent to the printing apparatus 2001, if the command of "SETPUNCH" does not exist as page description language of the print job, or if the parameter must be expressed by "0" or "1", but not be "TRUE" or "FALSE" (that is, a wrong construction exists), the command related to the punching function is described as "construction error".

For example, in the case that a print job including a command of "TRUE SETSTAPLE" for requesting to staple is sent to the printing apparatus 2001, even if the command of "SETSTAPLE" exists as page description language of the print job, and its construction is correct, because the printing apparatus does not have a mechanism of stapling, the command related to the stapling function is described as "non-support function".

As the first analyzing section 202, the second analyzing section 212 is a part that analyzes the print job received by the receiving section 101; and generates middle data.

Further, the second analyzing section 212 has an eliminating method used when a command of the analyzed print job is beyond spec range of the printing apparatus 2001.

However, in the first analyzing section 202 and in the second analyzing section 212, because the eliminating methods are different from each other in the case that a command is beyond spec range of the printing apparatus 2001, the middle data generated from the print job respectively analyzed by the two analyzing sections are also different from each other.

The analysis means selecting section 214 is a part to select which selection of the first analyzing section 202 and the second analyzing section 212 so as to generate the middle data of the print job.

That is, the analysis means selecting section 214 is a part to select middle data on the basis of "Time number" of the first non-support function table 208 and "Time number" of the second non-support function table 213.

The first non-support function table 208 is a table to store information that relates to the first analyzing section 202 and corresponds to items of "Notification", "Non-support function", "Command", "Threshold value" and "Time number", respectively.

Likewise, the second non-support function table 213 is a table to store information that relates to the second analyzing section 212 and corresponds to items of "Notification", "Non-support function", "Command", "Threshold value" and "Time number", respectively.

The following will explain about the content through using drawings.

FIG. 11A is a content explanatory diagram (I) of a first non-support function table in embodiment 2; FIG. 11B is a content explanatory diagram (II) of a first non-support function table in embodiment 2; FIG. 11C is a content explanatory diagram (III) of a first non-support function table in embodiment 2; FIG. 11D is a content explanatory diagram (IV) of a first non-support function table in embodiment 2; and FIG. 11E is a content explanatory diagram (V) of a first non-support function table in embodiment 2.

FIG. 12A is a content explanatory diagram (I) of a second non-support function table in embodiment 2; FIG. 12B is a content explanatory diagram (II) of a second non-support function table in embodiment 2; and FIG. 12C is a content explanatory diagram (III) of a second non-support function table in embodiment 2.

Because the first non-support function table 208 and the second non-support function table 213 have the same pattern, the following is regarding only to explain the FIG. 11. Regarding the FIG. 12, the explanation of FIG. 11 can be applied to it.

The item of "Notification" represents "ON" or "OFF". "ON" represents that the "Non-support function" must be notified, and "OFF" represents that the "Non-support function" must not be notified.

The user sets "ON" or "OFF" through operating the operating section 110 while looking display contents on the displaying section 109.

The item of "Non-support function" is a table of functions (includes functions of page description language and its own functions of apparatus) that can be analyzed by the first analyzing section 202, but can not be executed by the printing apparatus.

For example, as shown in FIG. 11, in the embodiment, as "Non-support function", that are set into "font" (e.g. Gothic-p, it corresponds to a command of "Gothic-p SETFONT"), "duplex print" (it corresponds to a command of "TRUE SETDUPLEX"), "staple" (it corresponds to a command of "TRUE SETSTAPLE") and "paper size" (e.g. A3, it corresponds to a command of "A3 SETPAPERSIZE") to correspond to the item of "Non-support function".

The value of "Threshold value" is for performing a judgment about print allowance/disallowance in the print allowance/disallowance judging section 207.

In the case that the time number of "Non-support function" detected by the non-support function detecting section 205 exceed the "Threshold value", the print allowance/disallowance judging section 108 judges that the print of the sent print job is disallowance.

Through user operates the operating section 110 while looking a display contents of the display section 109, it is possible to change the "Threshold value" by an integer value of 0 or over 0.

The value of "Time number" indicates time number detecting "Non-support function" by the non-support function detecting section 205.

The following is to return to FIG. 10, and explains a construction of the printing apparatus 2001 in the embodiment 2.

In the case that a command analyzed by the first analyzing section 202 specifies a "Non-support function", the non-support function detecting section 205 confirms whether it is "ON" or not in the term of "Notification" to correspond to the command through referring to the first non-support function table 208.

Further, if the "Notification" is "ON", the non-support function detecting section 205 notifies the calculating section 206 of detecting the command of the "Non-support function".

Furthermore, the non-support function detecting section 205 is also a part that detects non-support function whose parameter of the "Notification" is "ON" in the second non-support function table 213 from non-support functions analyzed by the second analyzing section 212; and notifies the calculating section 206 of the detection of the command of the "Non-support function".

Furthermore, the non-support function detecting section 205 is also a part that performs switching operation for notifying or not notifying the calculating section 206 of the detected "Non-support function".

For example, in the case that a print job including a command of "TRUE SETSTAPLE" for requesting to staple is sent to the printing apparatus 2001, if the first analyzing section 202 or the second analyzing section 212 can analyze the command, but the printing apparatus 2001 does not have a mechanism of stapling, the command of "SETSTAPLE" is concerning with a "Non-support function".

Because the item of "Notification" corresponding to the "SETSTAPLE" in the first non-support function table 208 or the second non-support function table 213 is "ON", the non-support function detecting section 205 notifies the calculating section 206 of the detection of the "Non-support function".

The calculating section 206, when the detection of the command of "Non-support function" is notified from the non-support function detecting section 205, adds "1" to the "Time number" corresponding to the detected command in the first non-support function table 208 or the second non-support function table 213.

The print allowance/disallowance judging section 207 confirms whether the time number of detecting the "Non-support function" exceeds a predetermined threshold value through referring to the first non-support function table 208 or the second non-support function table 213; and judges that the print is disallowance if the time number exceeds the threshold value.

Further, the print allowance/disallowance judging section 207 notifies the user that the print is disallowed through displaying list of the detected "Non-support function" on the displaying section 109 or through printing an error report.

Furthermore, the print allowance/disallowance judging section 207 has a setting of notice method for notifying user. Regarding the setting of the notice method, the user previously selects "display" or "report print" through operating the operating section 110 while looking a display contents on the displaying section 109.

The user interface controlling section 211 is a part that detects the pressed button in the operating section 110; and controls the display section 109 to display message and menu corresponding to the pressed button.

Further, the user interface controlling section 211 accesses the first non-support function table 208 and the second non-support function table 213; and deals with request from user for changing "ON" or "OFF" of the item of "Notification" or for changing value of the item of "Threshold value".

The printing apparatus 2001 in the embodiment 2 explained above operates as follows.
Explanation of the Operation First, content of print job used in the following operation explanation will be explained.

FIG. 13A is a first content explanatory diagram (I) of a print job in embodiment 2; and FIG. 13B is a first content explanatory diagram (II) of a print job in embodiment 2.

FIG. 14A is a second content explanatory diagram (I) of a print job in embodiment 2; and FIG. 14B is a second content explanatory diagram (II) of a print job in embodiment 2.

As shown in FIG. 13A, line L2001 of the print job specifies a paper size of A4.

Line L2002 specifies a duplex print.

Line L2003 specifies a font of "Mincho."

Line L2004 specifies to output a character string of "ABC" at a location of (50, 800) in the case that the lower left of medium is regarded as the origin (0, 0).

A unit of location is point, and 72 points correspond to 1 inch.

Line L2005 specifies a font of "Gothic."

Line L2006 specifies to output a character string of "DEF" at a location (50, 700).

Line L2007 specifies a font of "Gothic-P."

Line L2008 specifies to output a character string of "GHI" at a location (50, 600).

Line L2009 specifies a font of "Gothic-I."

Line L2010 specifies to output a character string of "JKL" at a location (50, 500).

Line L2100 represents the end of the print job.

Figure 15:
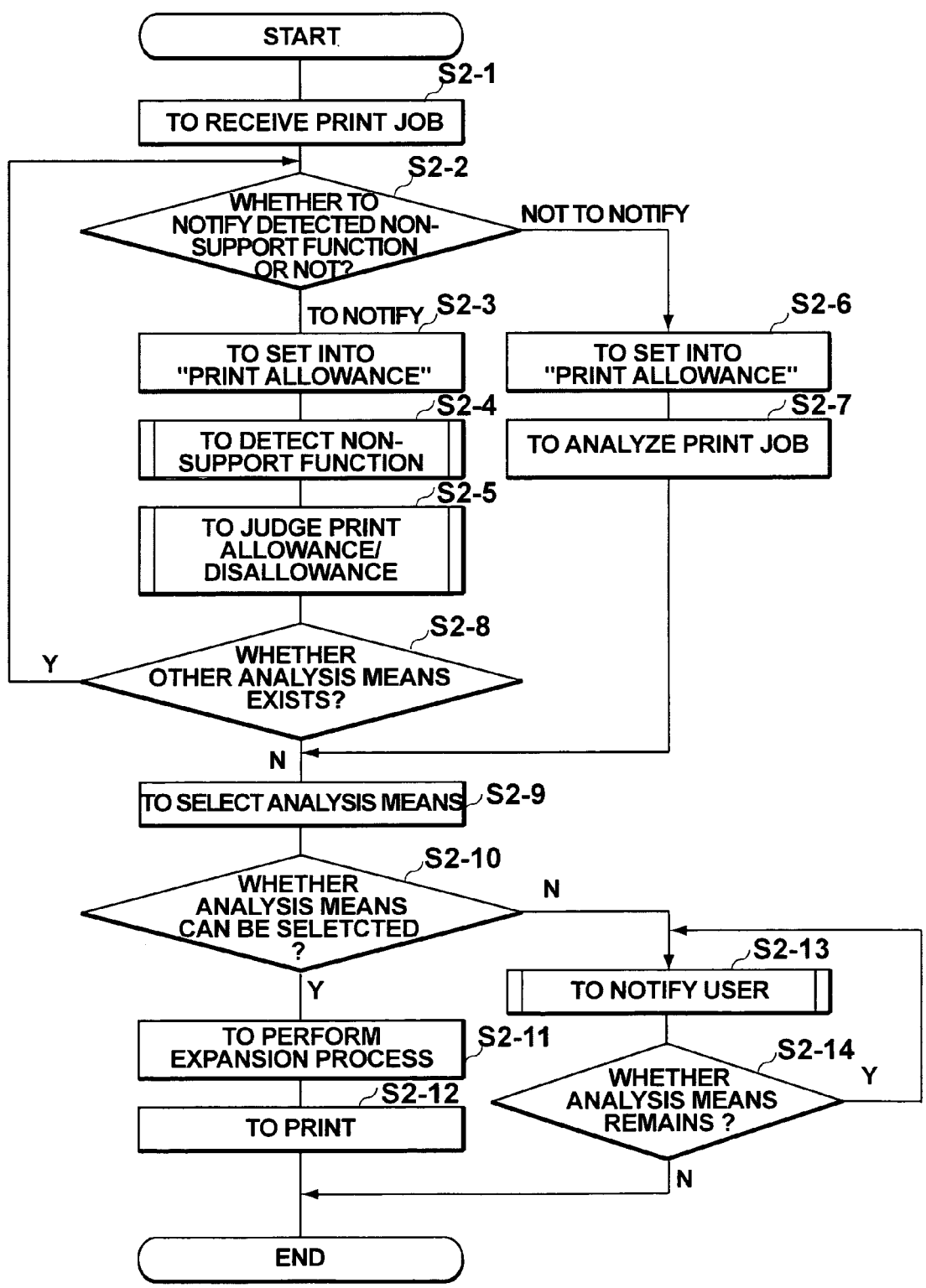
FIG. 15 is a flowchart for showing print process of a printing apparatus in embodiment 2.

FIG. 15 is a flowchart for showing print process of a printing apparatus in embodiment 2.

The flowchart represents the summary of the whole operation of the printing apparatus 2001.

First, it will be explained from step S2-1 to step S2-14 together with FIG. 10 according to a step order, next, about step to be explained in detail, it will be explained in detail through using other flowchart.

Step S2-1

The receiving section 101 receives a print job (FIG. 13A) from the external apparatus 1002 connected with LAN (Local Area Network) or USB cable.

Step S2-2

The first analyzing section 202 (in the case to repeat the flow again, as stated below, it is the second analyzing section 202) confirms a notice setting of the detected "Non-support function" with respect to the non-support function detecting section 205, and judges whether to notify or not notify the calculating section 206.

In the case that the notice setting stored in the non-support function detecting section 205 is "notify", the step S2-3 is started; in the case that it is "not notify", the step S2-6 is started.

Here, regarding the notice setting, it is obtained through user operates the operating section 110 in advance to shift menu executing the notice setting; makes the displaying section 109 display "whether notify the detected non-support function or not"; and presses button of the operating section 110 so as to select setting.

The selection result of the notice setting is stored in the non-support function detecting section 205.

Step S2-3

The print allowance/disallowance judging section 207 sets a parameter of "first print allowance/disallowance" (in the case to repeat the flow again, as stated below, it is "second print allowance/disallowance") into "print allowance" as an initiative setting.

Step S2-4

The non-support function detecting section 205 detects a "Non-support function" while command is being analyzed.

Here, regarding available font in the printing apparatus 2001, it is set as follows.

In the first analyzing section 202, "Mincho" font and "Mincho-I" font are available; and in the second analyzing section 212, "Mincho" font, "Gothic" font and "Mincho-I" font are available.

Regarding the operation flow of the non-support function detecting section 205, details will be explained later.

Step S2-5

The print allowance/disallowance judging section 207 performs a judgment of "print allowance/disallowance". Regarding operation flow of the print allowance/disallowance judging section 207, details will be explained later.

Step S2-6

The print allowance/disallowance judging section 207 sets parameters of "first print allowance/disallowance" and "second print allowance/disallowance" into "print allowance" as an initiative setting.

Step S2-7

The first analyzing section 202 analyzes the print job and generates middle data.

After finished analyzing till the end on line L2100 of the print job, the step S2-9 is started. Here, if "construction error" is detected in analyzing, the first analyzing section 202 stops the analysis.

Step S2-8

The analysis means selecting section 214 confirms whether other analysis means exists or not. If other analysis means does not exist, the step S2-9 is started; if it exists, the step S2-2 to the step S2-8 are repeated.

Step S2-9

The analysis means selecting section 214 selects which analysis means to expand the print job (FIG. 13A).

Regarding operation flow of the analysis means selecting section 214, details will be explained later.

Step S2-10

If the analysis means can be selected, the step S2-11 is started; if it can not be selected, the step S2-13 is started.

Step S2-11

The expanding section 103 expands the middle data generated by the selected analysis means (here, the first analyzing section 202 or the second analyzing section 212); and generates print data.

In the case that "construction error" is detected in the step S2-7, the expansion process is not performed because the middle data is not generated.

Step S2-12

The printing section 104 prints the print data generated in the step S2-11 on medium, and the flow is finished.

Step S2-13

The analysis means (here, the first analyzing section 202 or the second analyzing section 212), in the case that the analysis is stopped because of the occurrence of the "construction error" in analyzing in the step S2-7, prints error report, or displays error report on the displaying section 109 to notify user of the error, and the step S2-14 is started.

Regarding the flow of notifying user of the error occurrence, details will be explained later.

Step S2-14

The print allowance/disallowance judging section 207 inquires of the analysis means selecting section 214 whether other analysis means exists or not.

If other analysis means exists, the flow returns to the step S2-13 and the existed other analysis means is notified user; if it is not existed, the flow is finished.

Otherwise, regarding print result in the case that the print job is processed by the first analyzing section 202 or by the second analyzing section 212 in the step S2-12, it will be explained.

Figure 16A:
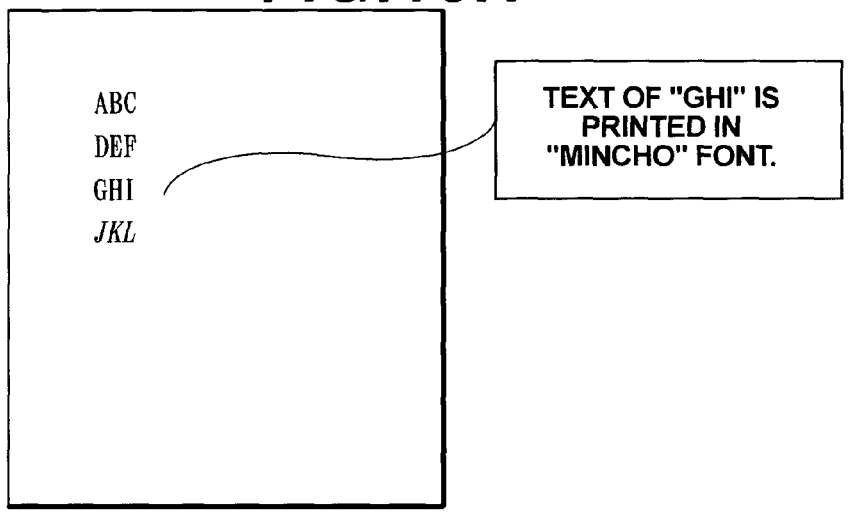
FIG. 16A is a first explanatory diagram of print result of print job.
Figure 16B:
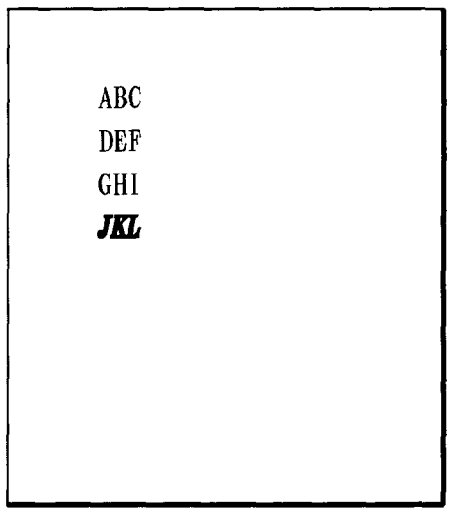
FIG. 16B is a second explanatory diagram of print result of print job.
Figure 16C:
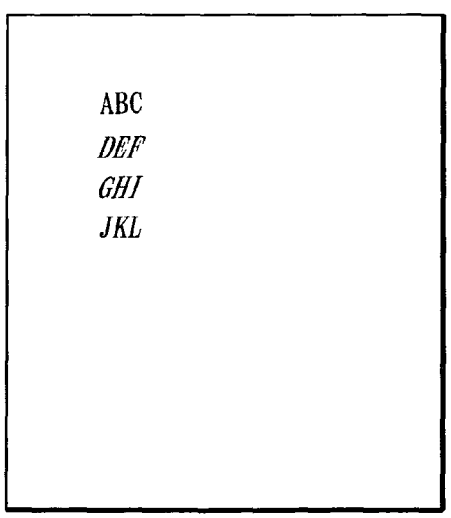
FIG. 16C is a third explanatory diagram of print result of print job.

FIG. 16A is a first explanatory diagram of print result of print job; FIG. 16B is a second explanatory diagram of print result of print job; and FIG. 16C is a third explanatory diagram of print result of print job.

FIG. 16A represents a print result in the case that the print job (FIG. 13A) is processed by the second analyzing section 212.

The text of "ABC" is printed in "Mincho" font, the text of "DEF" is printed in "Gothic" font, and the text of "JKL" is printed in "Gothic-I" font.

The text of "GHI" is printed in "Mincho" font replaced with "Gothic-P" font.

FIG. 16B represents a print result in the case that the print job (FIG. 13B) is processed by the second analyzing section 212.

The text of "ABC" is printed in "Mincho" font, the text of "DEF" is printed in "Mincho" font, the text of "GHI" is printed in "Mincho" font and the text of "JKL" is printed in "Gothic-I" font.

FIG. 16C represents a print result in the case that the print job (FIG. 14A) is processed by the first analyzing section 202.

The text of "ABC" is printed in "Mincho" font, the text of "DEF" is printed in "Mincho-I" font, the text of "GHI" is printed in "Mincho-I" font and the text of "JKL" is printed in "Mincho-I" font.

Figure 17:
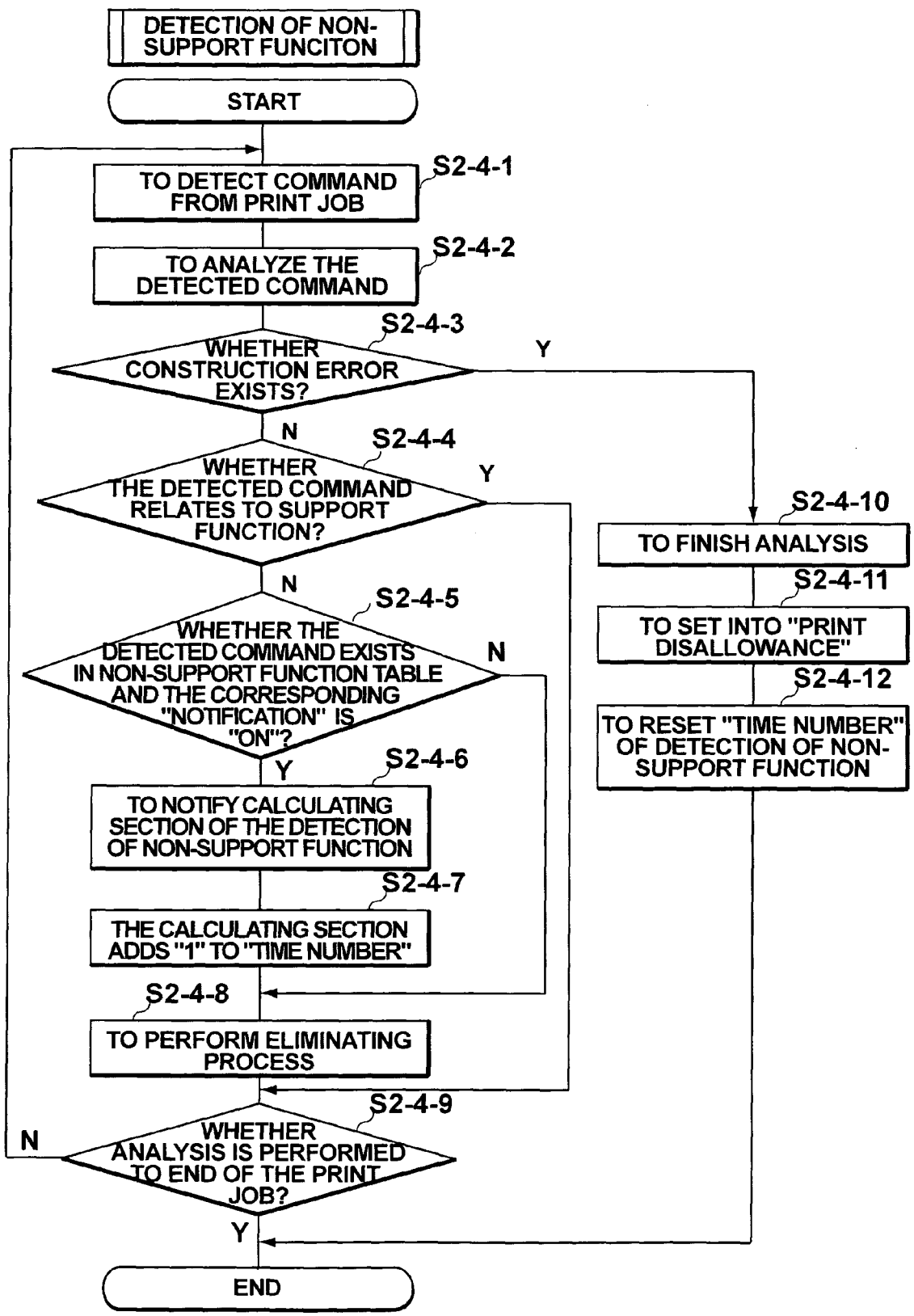
FIG. 17 is a flowchart for explaining in detail a detection flow of non-support function (S2-4) in embodiment 2.

FIG. 17 is a flowchart for explaining in detail a detection flow of non-support function (S2-4) in embodiment 2.

Regarding operation of the non-support function detecting section 205, details will be explained from step S2-4-1 to step S2-4-12 together with FIG. 10 according to a step order.

Step S2-4-1

The analyzing section (in the embodiment 2, the first analyzing section 202 and the second analyzing section 212) detects command and parameter character string from the print job (FIG. 13A) received by the receiving section 101.

Step S2-4-2

The analyzing section (in the embodiment 2, the first analyzing section 202 and the second analyzing section 212) analyzes the detected command and the detected parameter character string in the step S2-4-1.

Step S2-4-3

The analyzing section (in the embodiment 2, the first analyzing section 202 and the second analyzing section 212) confirms whether "construction error" exists or not. If the "construction error" is not detected, the step S2-4-4 is started; if it is detected, the step S2-4-10 is started.

Step S2-4-4

The analyzing section (in the embodiment 2, the first analyzing section 202 and the second analyzing section 212) confirms whether the command is within spec range of the printing apparatus 2001 or not. If the command is within spec range, the step S2-4-9 is started; if it is beyond spec range, the step S2-4-5 is started.

Step S2-4-5

The analyzing section (in the embodiment 2, the first analyzing section 202 and the second analyzing section 212) confirms that the command beyond spec range exists in the non-support function table (in the embodiment 2, the first analyzing section 202 corresponds to the first non-support function table 208; and the second analyzing section 212 corresponds to the second non-support function table 213) of the printing apparatus 2001 as "Non-support function", and also confirms whether the item of "Notification" related to the "Command" is ON or not.

If it is "ON", the step S2-4-6 is started; if it is "OFF", the step S2-4-8 is started.

Step S2-4-6

The non-support function detecting section 205 notifies the calculation section 206 of the detection of "SETFONT" command as a "Non-support function".

Step S2-4-7

The calculation section 206 adds "1" to the "time number" related to the "SETFONT" command in the non-support function table (in the embodiment 2, the first analyzing section 202 corresponds to the first non-support function table 208; and the second analyzing section 212 corresponds to the second non-support function table 213).

Step S2-4-8

The analyzing section (in the embodiment 2, the first analyzing section 202 and the second analyzing section 212) performs an error eliminating process according to the eliminating method provided previously.

Step S2-4-9

The analyzing section (in the embodiment 2, the first analyzing section 202 and the second analyzing section 212) confirms whether the analysis is performed till the end on line L2100 of the print job or not.

If the analysis is not completed to the end of the print job, the flow returns to step S2-4-1; if the analysis is completed to the end of the print job, the flow is finished.

Step S2-4-10

In the above step S2-4-3, in the case that the analyzing section (in the embodiment 2, the first analyzing section 202 and the second analyzing section 212) detects "construction error" in command of the print job, the analyzing section finishes the analysis process.

Step S2-4-11

The analyzing section (in the embodiment 2, the first analyzing section 202 and the second analyzing section 212) notifies the print allowance/disallowance judging section 207 that the "construction error" is detected, and the print allowance/disallowance judging section 207 sets the parameter of "print allowance/disallowance" into "print disallowance".

Step S2-4-12

The analyzing section (in the embodiment 2, the first analyzing section 202 and the second analyzing section 212) notifies the non-support function detecting section 205 of the "construction error".

The non-support function detecting section 205 notifies the calculating section 206 of the "construction error", then, the calculating section 206 resets all of the item of "time number" in the non-support function table (in the embodiment 2, the first non-support function table 208 and the second non-support function table 213) to "0", and the flow is finished.

Here, as a concrete example, a flow will be explained in the case that print job shown as FIG. 13A is received.

With respect to line L2001 of the print job (FIG. 13A), command "SETPAPERSIZE" and "A4" of parameter character string of the command "SETPAPERSIZE" are detected (step S2-4-1).

It is confirmed whether the command of "SETPAPERSIZE" (i.e. A4 SETPAPERSIZE) exists as a command of page description language, or whether parameter character string represents a paper size (step S2-4-2).

In the printing apparatus 2001, because A4 paper specified in the print job is available, the analyzing section (in the embodiment 2, the first analyzing section 202 and the second analyzing section 212) judges that the specified paper size corresponds to a support function.

Following the command of "A4 SETPAPERSIZE", the respective commands are sequentially analyzed.

Here, in the first analyzing section 202, "Mincho" font and "Mincho-I" font are available; in the second analyzing section 212, "Mincho" font, "Gothic" font and "Mincho-I" font are available.

In command execution of line L2003 of print job, when the first analyzing section 202 judges that the "Mincho" font is founded and "SETFONT" command can be supported, the step S2-4-9 is started to continue the step S2-4-4.

In command execution of line L2005 of print job, when the first analyzing section 202 judges that the "Gothic" font is not founded and "SETFONT" command cannot be supported, the step S2-4-5 is started to continue the step S2-4-4.

The non-support function detecting section 205 confirms whether "SETFONT" (i.e. "Gothic-P SETFONT") command exists in the item of "Command" of the first non-support function table 208.

Because the "SETFONT" command exists, further, the non-support function detecting section 205 confirms whether the item of "Notification" related to the command is "ON" (step S2-4-5).

In the step S2-4-5, because the "SETFONT" command exists in the "Command" of the first non-support function table 208 and the item of "Notification" related to the "Command" is "ON", the step S2-4-6 is started.

Here, the non-support function detecting section 205 notifies the calculation section 206 that the "SETFONT" command as "Non-support function" is detected (step S2-4-6).

The calculation section 206 adds "1" to the value of "time number" related to the "SETFONT" command in the first non-support function table 208 (step S2-4-7).

The first analyzing section 202 performs error eliminating process of the "SETFONT" command according to eliminating method which is provided previously (step S2-4-8).

The error eliminating process is to replace the "Gothic-P" font into font previously stored in a default of the printing apparatus 2001. That is, here, the font of "Gothic-P type" is replaced with the font of "Mincho type".

After the first analyzing section 202 performed the same process to analyze print job (FIG. 13A) till line L2100, the first non-support function table 208 is changed to FIG. 11B. As shown by FIG. 11B, the time number of "SETFONT" command is replaced with three times.

Figure 18:
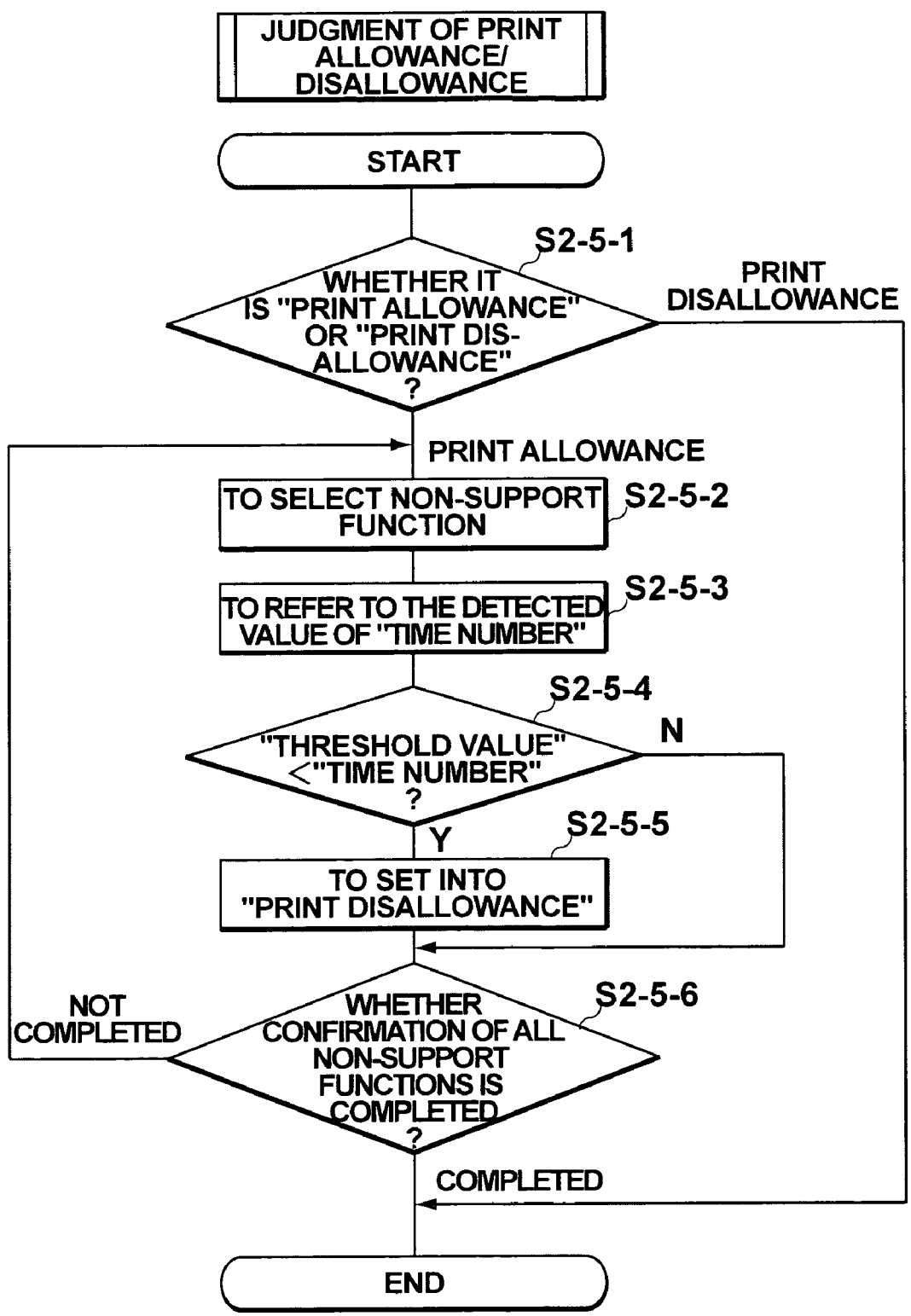
FIG. 18 is a flowchart for explaining in detail a print allowance/disallowance judgment flow (S2-5) in embodiment 2.

FIG. 18 is a flowchart for explaining in detail a print allowance/disallowance judgment flow (S2-5) in embodiment 2.

Regarding operation of the print allowance/disallowance judging section 207, details will be explained from step S2-5-1 to step S2-5-6 together with FIG. 10 according to a step order.

Step S2-5-1

The print allowance/disallowance judging section 207 confirms the parameter of "first print allowance/disallowance" or "second print allowance/disallowance".

If the parameter of "first print allowance/disallowance" or "second print allowance/disallowance" is "print disallowance", the flow is finished; if it is "print allowance", the step S2-5-2 is started.

Step S2-5-2

The print allowance/disallowance judging section 207 selects the non-support function table (in the embodiment 2, the first non-support function table 208 and the second non-support function table 213).

Step S2-5-3

The print allowance/disallowance judging section 207 refers to a value of "Time number" in the non-support function table (in the embodiment 2, the first non-support function table 208 and the second non-support function table 213) related to the selected font.

Step S2-5-4

The print allowance/disallowance judging section 207 compares the referred value of "Time number" with a value of "Threshold value" related to the font.

If the value of the "Time number" is bigger than the "Threshold value", the step S2-5-5 is started; if not, the step S2-5-6 is started.

Step S2-5-5

The print allowance/disallowance judging section 207 sets the parameter of "first print allowance/disallowance" or "second print allowance/disallowance" into "print disallowance".

Step S2-5-6

In the case that all "non-support function" are confirmed, the flow is finished; if they are not, the step S2-5-2 to the step S2-5-6 are repeated.

Here, as a concrete example, in the case that the first non-support function table 208 is that shown by FIG. 11C and the second non-support function table 213 is that shown by FIG. 12C, here, in the FIG. 12C, the time number of "SETFONT" command is replaced with three times.

Because the value of "Threshold value" is "2" and the value of "Time number" is "3", the step S2-5-5 is started.

Therefore, in the step S2-5-5, the print allowance/disallowance judging section 207 sets the parameter of "first print allowance/disallowance" or "second print allowance/disallowance" into "print disallowance".

Figure 19:
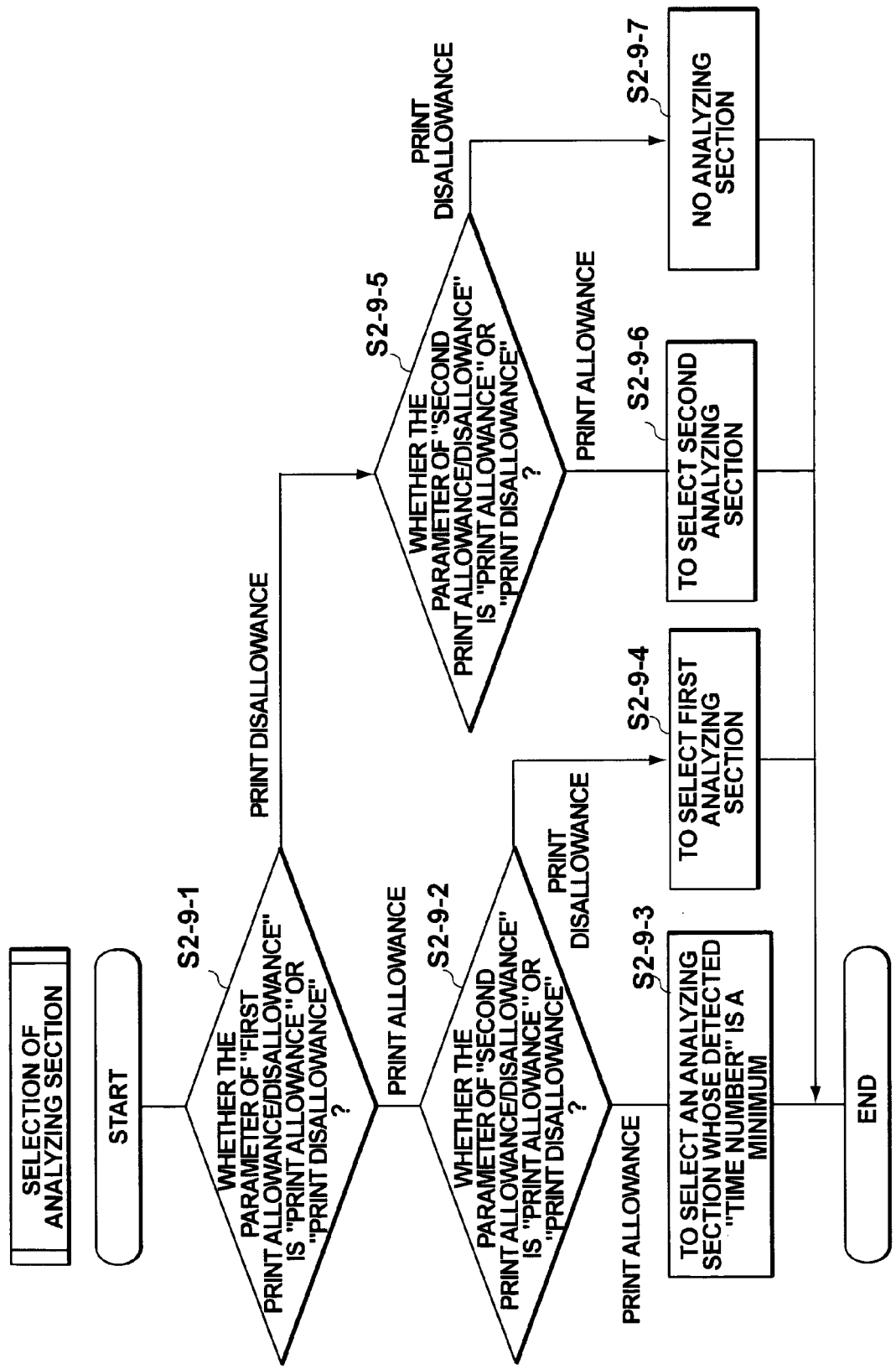
FIG. 19 is a flowchart for explaining in detail an analysis means selection flow (S2-9) in embodiment 2.

FIG. 19 is a flowchart for explaining in detail an analysis means selection flow (S2-9) in embodiment 2.

Regarding operation of the analysis means selecting section 214, details will be explained from step S2-9-1 to step S2-9-7 together with FIG. 10 according to a step order.

Step S2-9-1

The analysis means selecting section 214 confirms the parameter of "first print allowance/disallowance" in the print allowance/disallowance judging section 207.

If the parameter is "print disallowance", the step S2-9-5 is started; if it is "print allowance", the step S2-9-2 is started.

Step S2-9-2

The analysis means selecting section 214 confirms the parameter of "second print allowance/disallowance" in the print allowance/disallowance judging section 207.

If the parameter is "print disallowance", the step S2-9-4 is started; if it is "print allowance", the step S2-9-3 is started.

Step S2-9-3

The analysis means selecting section 214 selects an analyzing section whose detected time number is a minimum (in the embodiment 2, it is one of the first analyzing section 202 and the second analyzing section 212); and finishes the flow.

Otherwise, in the case that both of the detected time number are same, the analysis means selecting section 214 selects the first analyzing section 202; and finishes the flow.

Step S2-9-4

The analysis means selecting section 214 selects the first analyzing section 202; and finishes the flow.

Step S2-9-5

The analysis means selecting section 214 confirms the parameter of "second print allowance/disallowance" in the print allowance/disallowance judging section 207.

If the parameter is "print allowance", the step S2-9-6 is started; if it is "print disallowance", the step S2-9-7 is started.

Step S2-9-6

The analysis means selecting section 214 selects the second analyzing section 212; and finishes the flow.

Step S2-9-7

The analysis means selecting section 214 judges "no analysis means"; and finishes the flow.

Here, as a concrete example, in the case that the print job is shown as FIG. 13B, the first non-support function table 208 becomes that shown by FIG. 11C, and the parameter of "first print allowance/disallowance" in the print allowance/disallowance judging section 207 becomes "print allowance".

Furthermore, the second non-support function table 213 becomes that shown by FIG. 12B, and the parameter of "second print allowance/disallowance" in the print allowance/disallowance judging section 207 becomes "print allowance".

At that time, the analysis means selecting section 214 compares a total of the "Time number" in the first non-support function table 208 with a total of the "Time number" in the second non-support function table 213.

Regarding the "Time number" in the first non-support function table 208, because "font" is "1", "duplex print" is "0", "staple" is "0", and "paper size" is "0", a total of the "Time number" in the first non-support function table 208 becomes "1".

Regarding the "Time number" in the second non-support function table 213, because "font" is "0", "duplex print" is "0", "staple" is "0", and "paper size" is "0", a total of the "Time number" in the second non-support function table 213 becomes "0".

Accordingly, a table of analysis means whose "Time number" is minimum, that is, the second analyzing section 212 is selected.

Otherwise, if both of the "Time number" are the same value, the first analyzing section 202 is selected.

Further, in the case that the print job is shown as FIG. 14A, the first non-support function table 208 becomes that shown by FIG. 11E, and the parameter of "first print allowance/disallowance" in the print allowance/disallowance judging section 207 becomes "print allowance".

The second non-support function table 213 becomes that shown by FIG. 12D, and-the parameter of "second print allowance/disallowance" in the print allowance/disallowance judging section 207 becomes "print disallowance".

In this case, the step S2-9-1, the step S2-9-2 and the step S2-9-4 are started according to a step order, then, the analysis means selecting section 214 selects the first analyzing section 202.

Further, in the case that the print job is shown by FIG. 14B, the first non-support function table 208 becomes that shown by FIG. 11D, and the parameter of "first print allowance/disallowance" in the print allowance/disallowance judging section 207 becomes "print disallowance".

The second non-support function table 213 becomes that shown by FIG. 12C, and the parameter of "second print allowance/disallowance" in the print allowance/disallowance judging section 207 becomes "print disallowance".

In this case, the step S2-9-1, the step S2-9-5 and the step S2-9-7 are started according to a step order, then, the analysis means selecting section 214 judges "no analysis means".

Figure 20:
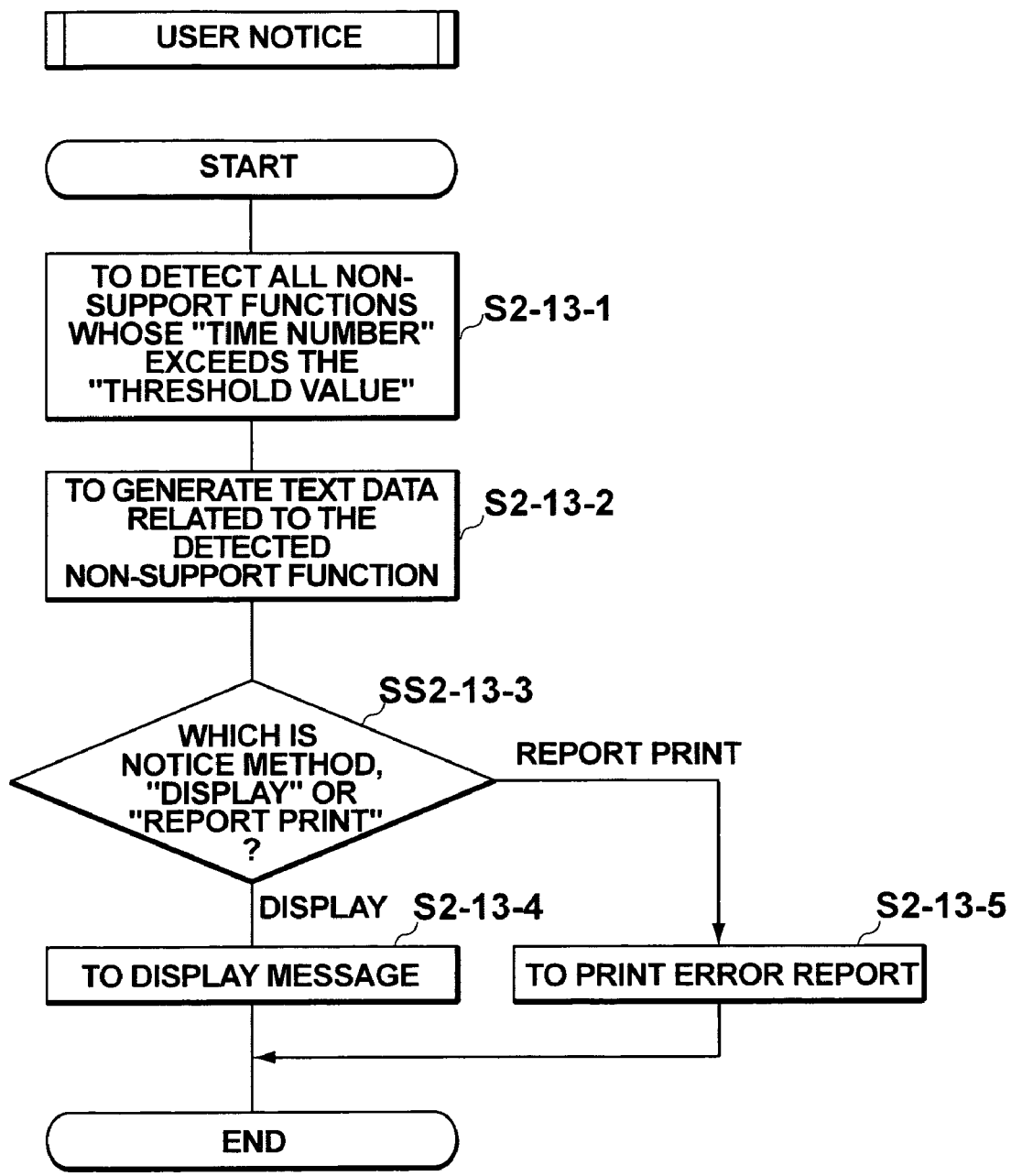
FIG. 20 is a flowchart for explaining in detail a user notice flow (S2-13) in embodiment 2.

FIG. 20 is a flowchart for explaining in detail a user notice flow (S2-13) in embodiment 2.

Regarding operation of the user notice flow (S2-13), details will be explained from step S2-13-1 to step S2-13-5 together with FIG. 10 according to a step order.

First, content of user message in the user notice flow (S2-13) is explained.

FIG. 21A is a first content explanatory diagram of message to user in embodiment 2; and FIG. 21B is a second content explanatory diagram of message to user in embodiment 2.

As shown by FIG. 21A and FIG. 21B, as an example, the message to user includes a content to notify that "Non-support function" is detected (FIG. 21A) and a content to notify that "construction error" is detected (FIG. 21B).

Returning to FIG. 20, operation of the user notice flow (S2-13) will be explained.

Step S2-13-1

The print allowance/disallowance judging section 108 detects "Non-support function" whose "Time number" exceeds the "Threshold value" in the non-support function table (in the embodiment 2, the first non-support function table 208 and the second non-support function table 213).

However, in the case that "construction error" is detected in the step S2-4-3, because all of values of "Time number" are "0", there is no corresponding "Non-support function".

Step S2-13-2

The print allowance/disallowance judging section 207 generates text data shown as FIG. 21A through adding message to the "Non-support function" detected in the step S2-13-1.

Moreover, in the case that "construction error" is detected in the step S2-4-3, because no any "Non-support function" is detected in the step S2-13-1, the print allowance/disallowance judging section 207 generates such text data as shown by FIG. 21B.

Step S2-13-3

The print allowance/disallowance judging section 108 confirms the notice method to user, which previously set in the print allowance/disallowance judging section 108.

If the notice method is "report print", the step 2-13-5 is started; if it is "display", the step 2-13-4 is started.

Step S2-13-5

The print allowance/disallowance judging section 207 deletes the middle data generated by the analyzing section (in the embodiment 2, the first analyzing section 202 and the second analyzing section 212); and sends the text data generated in the step S2-13-2 to the user interface controlling section 111.

The user interface controlling section 111 displays the text data on the displaying section 109, and the flow is finished.

Step S2-13-5

The print allowance/disallowance judging section 207 deletes the middle data generated by the analyzing section (in the embodiment 2, the first analyzing section 202 and the second analyzing section 212); generates page of format shown as FIG. 21A and FIG. 21B from the text data generated in the step S2-13-2; and sends the page data to the analyzing section (in the embodiment 2, the first analyzing section 202 and the second analyzing section 212).

The analyzing section (in the embodiment 2, the first analyzing section 202 and the second analyzing section 212) performs analysis and changes the page data into middle data.

The expanding section 103 generates print data from the middle data.

The printing section 104 prints the print data on medium to notify user of error report, and the flow is finished.

Next, operation of setting change of the first non-support function table 208 and the second non-support function table 213 will be explained.

Figure 22A:
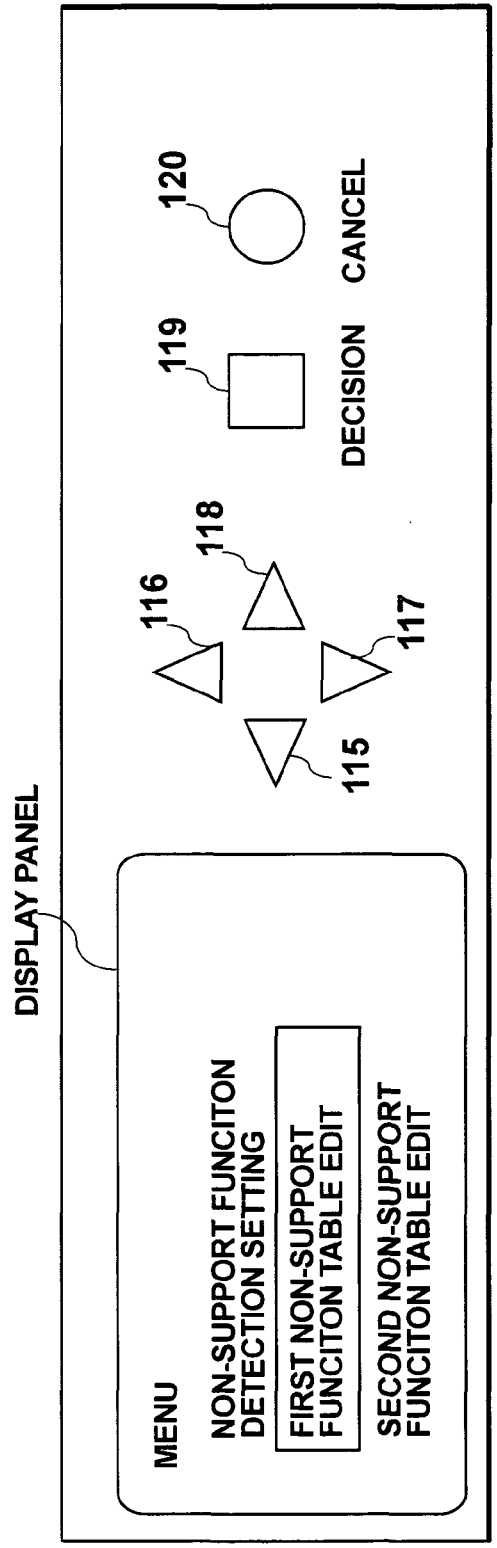
FIG. 22A is a first explanatory diagram of a displaying section and an operating section in embodiment 2.
Figure 22B:
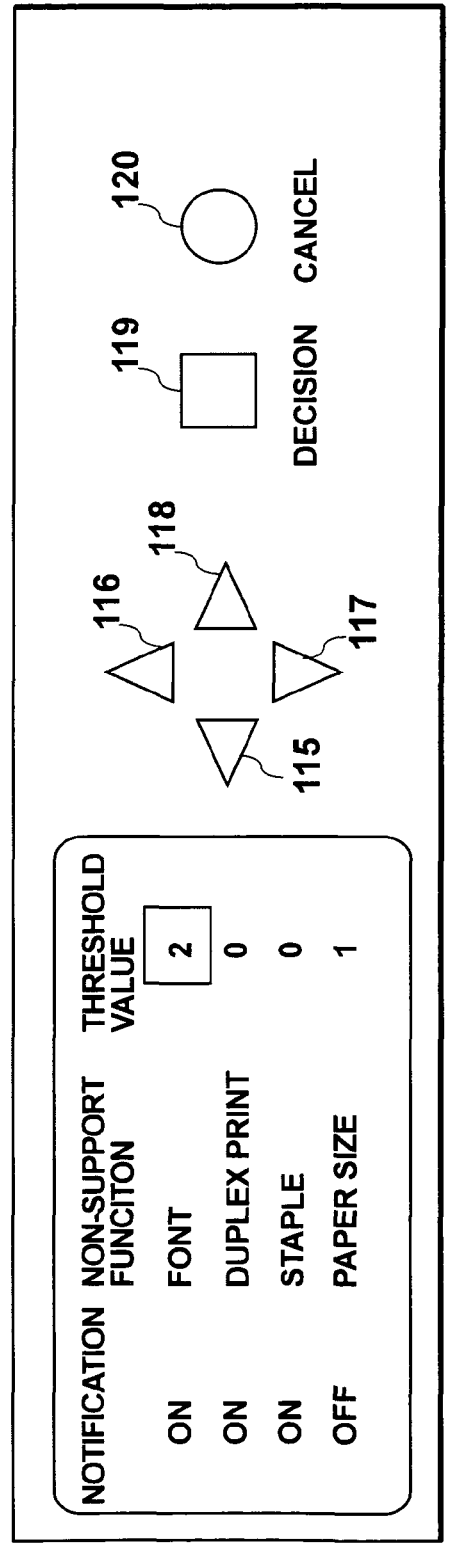
FIG. 22B is a second explanatory diagram of a displaying section and an operating section in embodiment 2.

FIG. 22A is a first explanatory diagram of a displaying section and an operating section in embodiment 2; and FIG. 22B is a second explanatory diagram of a displaying section and an operating section in embodiment 2.

As shown by FIG. 22A and FIG. 22B, the user presses plurally a button 115, a button 116, a button 117 and a button 118 of the operating section 110 to obtain a scene shown by FIG. 22A.

Next, the user presses a button 119 to select one of the "first non-support function table edit" and the "second non-support function table edit"; and obtain a scene shown by FIG. 22B.

The user moves cursor to corresponding item when user hopes to change through pressing the button 115, the button 116, the button 117 and the button 118.

In FIG. 22B, the cursor is moved to the item of the "Threshold value" of font related to "Non-support function".

After pressing the button 119 once to select the "Threshold value", the user presses plurally the button 116 or the button 117 to change the "Threshold value" into an optional positive integer value.

Further, the user presses the button 119 to set the changed value.

In the case that the item to be changed is "Notification", through using the button 116 and the button 117, "ON" or "OFF" is selectively set.

Explanation of the Effect

As explained above, in the embodiment, not only it is possible to obtain the effect in embodiment 1, but also it is possible to get better print result through using plural analyzing means to process print job; comparing time number of error occurrence with respect to each analyzing means; and selecting analyzing means whose error is less.

The Utilization Possibility in Industry

In the above stated explanation, only such case is explained that the present invention is applied to a printing apparatus. However, the present invention also can be applied to multiplex apparatus, facsimile, and copying apparatus.

The present invention is not limited to the foregoing embodiments but many modifications and variations are possible within the spirit and scope of the appended claims of the invention.

What is claimed is:

1. A printing apparatus which receives a print job, and performs a print on the basis of the print job, comprising:
   a non-support function detecting section for detecting an instruction to request use of a non-supported function which is not supported by the printing apparatus;
   a calculating section for calculating information for determining a number of times an instruction that requests use of the non-supported function is detected by the non-support function detecting section;
   a print allowance/disallowance judging section for judging whether the print of the print job is allowed or disallowed, the print being allowed when the determined number of times does not exceed a threshold value greater than zero, the print being disallowed when the determined number of times exceeds the threshold value; and
   a printing section that prints a modified version of the print job that has the non-supported function eliminated when the print is judged to be allowed, and not printing when the print is judged to be disallowed.

2. The printing apparatus according to claim 1, further comprising:
   an information storing section to store print allowance/disallowance judgment information, wherein the print allowance/disallowance judgment information includes identifying information of the non-supported function,
   a command related to the non-supported function,
   a flag for controlling the use of information relating to the non-supported function, the number of times, the number of times being determined from the calculated information, the threshold value.

3. The printing apparatus according to claim 2, further comprising:

a first data changing means for analyzing information and generating first print data on the basis of the print job;

a second data changing means for analyzing information and generating second print data which is different from the first print data on the basis of the print job; and a changing means selecting section, wherein the print allowance/disallowance judging section judges whether the print of the print job is allowed or disallowed based upon one of first print allowance/disallowance judgment information obtained from the first print data and second print allowance/disallowance judgment information obtained from the second print data, and wherein the changing means selecting section selects one of the first print data from the first data changing means and the second print data from the second data changing means to determine whether printing is allowed or disallowed on the basis of a number of times an instruction that requests use of the non-supported function is detected in the first print allowance/disallowance judgment information and on the basis of a number of times an instruction that requests use of the non-supported function is detected in the second print allowance/disallowance judgment information.

4. The printing apparatus according to claim 1, further comprising:

a command analyzing section for analyzing a command forming the print job, wherein the non-support function detecting section detects the instruction to request use of the non-supported function when the command in the print job is analyzed by the command analyzing section as being constructed without error, but is beyond a range of supported functions of the printing apparatus.

5. The printing apparatus according to claim 4, further comprising:

an information storing section to store print allowance/disallowance judgment information, wherein the print allowance/disallowance judgment information includes identifying information of the non-supported function, a command related to the non-supported function, a flag for controlling the use of information relating to the non-supported function, the number of times, the number of times being determined from the calculated information, the threshold value.

6. The printing apparatus according to claim 5, further comprising:

a first data changing means for analyzing information and generating first print data on the basis of the print job;

a second data changing means for analyzing information and generating second print data which is different from the first print data on the basis of the print job; and a changing means selecting section, wherein the print allowance/disallowance judging section judges whether the print of the print job is allowed or disallowed based upon one of first print allowance/disallowance judgment information obtained from the first print data and second print allowance/disallowance judgment information obtained from the second print data, and wherein the changing means selecting section selects one of the first print data from the first data changing means and the second print data from the second data changing means to determine whether printing is allowed or disallowed on the basis of a number of times an instruction that requests use of the non-supported function is detected in the first print allowance/disallowance judgment information and on the basis of a number of times an instruction that requests use of the non-supported function is detected in the second print allowance/disallowance judgment information.

7. The printing apparatus according to claim 1, wherein the print allowance/disallowance judging section notifies a user using a notification method when printing is disallowed.

8. The printing apparatus according to claim 7, wherein the notification includes an identification of the non-supported function.

9. The printing apparatus according to claim 7, wherein the notification method is predetermined.

10. The printing apparatus according to claim 7, wherein the notification method is to display a message.

11. The printing apparatus according to claim 7, wherein the notification method is to print a message.

12. The printing apparatus according to claim 1, wherein the threshold value is adjustable by the user.

13. The printing apparatus according to claim 1, wherein the threshold value is greater than or equal to two.

* * * * *